United States Patent
Hussain et al.

(10) Patent No.: US 12,099,778 B2
(45) Date of Patent: *Sep. 24, 2024

(54) VERIFYING OPERATIONAL STATUSES OF AGENTS INTERFACING WITH DIGITAL ASSISTANT APPLICATIONS

(71) Applicant: GOOGLE LLC, Mountain View, CA (US)

(72) Inventors: Quazi Hussain, Mountain View, CA (US); Nikhil Rao, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/498,542

(22) Filed: Oct. 11, 2021

(65) Prior Publication Data
US 2022/0027124 A1   Jan. 27, 2022

Related U.S. Application Data

(63) Continuation of application No. 16/611,461, filed as application No. PCT/US2018/031452 on May 7, 2018, now Pat. No. 11,144,278.

(51) Int. Cl.
*G06F 3/16* (2006.01)
*G10L 15/22* (2006.01)
(Continued)

(52) U.S. Cl.
CPC .............. *G06F 3/167* (2013.01); *G10L 15/22* (2013.01); *H04L 43/0817* (2013.01);
(Continued)

(58) Field of Classification Search
CPC ... G06F 3/167; G10L 15/22; G10L 2015/223; H04L 43/0817; H04L 43/10; H04L 43/55
See application file for complete search history.

(56) References Cited

U.S. PATENT DOCUMENTS 6,799,147 B1   9/2004   Balasubramanian et al.
6,829,642 B1   12/2004   Giroir et al.
(Continued)

FOREIGN PATENT DOCUMENTS

CN   106469040     3/2017
CN   106716404 X   5/2017
(Continued)

OTHER PUBLICATIONS

European Patent Office; Intention to Grant issued in Application No. 18726900.6, 72 pages, dated Oct. 12, 2022.
(Continued)

*Primary Examiner* — Austin J Moreau
(74) *Attorney, Agent, or Firm* — Gray Ice Higdon

(57) ABSTRACT

The present disclosure is generally related to a data processing system to determine operational statuses of agents interfacing with digital assistant applications. The data processing system can access a log database. The log database can maintain response metrics for an agent service. Each response metric can correspond to a response by the agent service to a request generated by a digital assistant application responsive to an input audio signal. The data processing system can transmit a ping request to the agent service and can wait for a second response from the agent service. The data processing system can determine an operational status of the agent service based on the response metrics and on a time elapsed since the transmission of the ping request. The data processing system can cause the digital assistant application to perform an action based on the operational status.

18 Claims, 6 Drawing Sheets

(51) Int. Cl.
  *H04L 43/0817* (2022.01)
  *H04L 43/10* (2022.01)
  *H04L 43/55* (2022.01)

(52) U.S. Cl.
  CPC .............. *H04L 43/10* (2013.01); *H04L 43/55* (2022.05); *G10L 2015/223* (2013.01)

(56) References Cited

U.S. PATENT DOCUMENTS

| | | |
|---|---|---|
| 6,892,235 B1 | 5/2005 | Daude et al. |
| 7,366,790 B1 | 4/2008 | Rustad et al. |
| 7,580,996 B1 | 8/2009 | Allan et al. |
| 8,200,842 B1 | 6/2012 | Lau |
| 9,275,641 B1 | 3/2016 | Gelfenbeyn et al. |
| 9,313,098 B1 | 4/2016 | Lazarescu et al. |
| 9,887,894 B2 | 2/2018 | Zalmanovitch et al. |
| 10,115,400 B2 | 10/2018 | Wilberding |
| 10,122,862 B2 | 11/2018 | Tucker |
| 10,142,241 B1 | 11/2018 | VanLoon et al. |
| 10,320,680 B1 | 6/2019 | Mehr |
| 10,440,042 B1 | 10/2019 | Stein et al. |
| 10,484,257 B1 | 11/2019 | Louca et al. |
| 10,511,690 B1 | 12/2019 | Chatterjee |
| 10,558,541 B1 | 2/2020 | Chakkassery et al. |
| 10,867,601 B2 | 12/2020 | Bulpin |
| 11,144,278 B2 | 10/2021 | Hussain et al. |
| 2003/0005078 A1 | 1/2003 | Turicchi et al. |
| 2003/0005112 A1 | 1/2003 | Krautkremer |
| 2003/0105763 A1 | 6/2003 | Chatfield et al. |
| 2004/0139194 A1 | 7/2004 | Naganathan |
| 2004/0267535 A1 | 12/2004 | Kotzin |
| 2005/0064821 A1 | 3/2005 | Hedberg et al. |
| 2005/0108133 A1 | 5/2005 | Balasubramanian et al. |
| 2005/0262244 A1 | 11/2005 | Smyth et al. |
| 2006/0064483 A1 | 3/2006 | Patel |
| 2007/0123222 A1 | 5/2007 | Cox et al. |
| 2007/0192400 A1 | 8/2007 | Lee |
| 2007/0294388 A1 | 12/2007 | Yu |
| 2008/0043617 A1 | 2/2008 | Schekochikhin et al. |
| 2008/0043622 A1 | 2/2008 | Kamath et al. |
| 2008/0046558 A1 | 2/2008 | Raja et al. |
| 2008/0049616 A1 | 2/2008 | Kamath et al. |
| 2008/0049786 A1 | 2/2008 | Ram et al. |
| 2008/0133739 A1 | 6/2008 | Zuzga et al. |
| 2008/0168116 A1 | 7/2008 | Oda et al. |
| 2008/0178190 A1 | 7/2008 | Anstey et al. |
| 2008/0250128 A1 | 10/2008 | Sargent |
| 2009/0144408 A1 | 6/2009 | Wilf |
| 2009/0157870 A1 | 6/2009 | Nakadai |
| 2010/0077072 A1 | 3/2010 | Guruswamy et al. |
| 2010/0088404 A1 | 4/2010 | Mani et al. |
| 2010/0131946 A1 | 5/2010 | Degaonkar et al. |
| 2010/0161563 A1 | 6/2010 | Arunachalam |
| 2011/0087916 A1 | 4/2011 | Yoo |
| 2011/0149737 A1 | 6/2011 | Muthiah et al. |
| 2011/0153810 A1 | 6/2011 | Raja et al. |
| 2012/0144015 A1 | 6/2012 | Jalan et al. |
| 2012/0278477 A1 | 11/2012 | Terrell et al. |
| 2013/0155933 A1 | 6/2013 | Kneckt et al. |
| 2014/0006609 A1 | 1/2014 | Gay et al. |
| 2014/0040748 A1 | 2/2014 | Lemay et al. |
| 2014/0122567 A1 | 5/2014 | Suryavanshi |
| 2014/0164476 A1 | 6/2014 | Thomson |
| 2014/0173089 A1 | 6/2014 | Li et al. |
| 2014/0207937 A1 | 7/2014 | Georgiev et al. |
| 2014/0304352 A1 | 10/2014 | Chaudhary et al. |
| 2014/0304412 A1 | 10/2014 | Prakash et al. |
| 2014/0304413 A1 | 10/2014 | Kondamuru et al. |
| 2014/0304414 A1 | 10/2014 | Yengalasetti et al. |
| 2014/0310002 A1 | 10/2014 | Nitz et al. |
| 2015/0067184 A1 | 3/2015 | Parthasarathy |
| 2015/0120903 A1 | 4/2015 | Zakharov et al. |
| 2015/0180750 A1 | 6/2015 | LaPlante et al. |
| 2015/0185996 A1 | 7/2015 | Brown et al. |
| 2015/0254248 A1 | 9/2015 | Burns et al. |
| 2015/0281140 A1 | 10/2015 | Hasin et al. |
| 2015/0348547 A1 | 12/2015 | Paulik et al. |
| 2016/0173578 A1 | 6/2016 | Sharma et al. |
| 2016/0189717 A1 | 6/2016 | Kannan et al. |
| 2016/0203002 A1 | 7/2016 | Kannan et al. |
| 2016/0323173 A1 | 11/2016 | Bivens et al. |
| 2017/0003960 A1 | 1/2017 | Subramanian et al. |
| 2017/0090589 A1 | 3/2017 | Sharma et al. |
| 2017/0104874 A1 | 4/2017 | Yi et al. |
| 2017/0161829 A1 | 6/2017 | Mazier |
| 2017/0187604 A1 | 6/2017 | Dixon et al. |
| 2017/0242784 A1 | 8/2017 | Heorhiadi et al. |
| 2017/0372703 A1 | 12/2017 | Sung et al. |
| 2018/0122377 A1 | 5/2018 | Skantze et al. |
| 2018/0124189 A1 | 5/2018 | Edgington et al. |
| 2018/0146034 A1 | 5/2018 | Lintner et al. |
| 2018/0218731 A1 | 8/2018 | Gustafson et al. |
| 2018/0232678 A1 | 8/2018 | Chirayil et al. |
| 2018/0234745 A1 | 8/2018 | Schweitzer, III |
| 2018/0277113 A1* | 9/2018 | Hartung .................. G10L 15/22 |
| 2018/0295176 A1 | 10/2018 | Sundaresan et al. |
| 2018/0321905 A1* | 11/2018 | Fountaine ............... G06F 3/165 |
| 2018/0366118 A1 | 12/2018 | Lovitt et al. |
| 2019/0005021 A1 | 1/2019 | Miller et al. |
| 2019/0026737 A1* | 1/2019 | McLaughlin .......... G06Q 20/40 |
| 2019/0087446 A1 | 3/2019 | Sharma et al. |
| 2019/0102376 A1 | 4/2019 | Agrawal |
| 2019/0103103 A1 | 4/2019 | Ni et al. |
| 2019/0132307 A1* | 5/2019 | Pitchaimani ......... A61C 9/0066 |
| 2019/0180746 A1 | 6/2019 | Diwan et al. |
| 2019/0236205 A1 | 8/2019 | Jia et al. |
| 2019/0250970 A1 | 8/2019 | Gupta et al. |
| 2019/0266999 A1 | 8/2019 | Chandrasekaran et al. |
| 2019/0267000 A1 | 8/2019 | Liashenko et al. |
| 2019/0280950 A1 | 9/2019 | Alshafei et al. |
| 2019/0294524 A1 | 9/2019 | Gupta et al. |
| 2019/0294933 A1 | 9/2019 | Gupta et al. |
| 2019/0306044 A1 | 10/2019 | Cohen et al. |
| 2019/0341032 A1 | 11/2019 | Hammons et al. |
| 2019/0341033 A1 | 11/2019 | Hammons et al. |
| 2020/0076898 A1* | 3/2020 | Shukla .................. H04L 67/125 |

FOREIGN PATENT DOCUMENTS

| | | |
|---|---|---|
| CN | 107004413 | 8/2017 |
| CN | 107111516 | 8/2017 |
| CN | 107112015 | 8/2017 |

OTHER PUBLICATIONS

China National Intellectual Property Administration; Notification of First Office Action issued in Application No. 201880028333.1; 12 pages; dated Nov. 22, 2021.

European Patent Office; Communication Pursuant to Article 94(3) EPC issue in Application No. EP18726900; 3 bages; dated Nov. 12, 2020.

European Patent Office, Written Opinion of the International Preliminary Examining Authority of PCT Ser. No. PCT/US2018/031452; 7 pages; dated Mar. 27, 2020.

European Patent Office; International Search Report and Writen Opinion of the International Search Authority for PCE Appl. No. PCT/2018031452; 10 pages; dated Jan. 21, 2019.

Chinese National Intellectual Property Administration; Notice of Grant issued in Application No. CN201880028333.1; 4 pages dated May 6, 2022.

China National Intellectual Property Administration; Notification of First Office Action issued in Application No. 202210853089 0; 20 pages; dated Jun. 28, 2024.

* cited by examiner

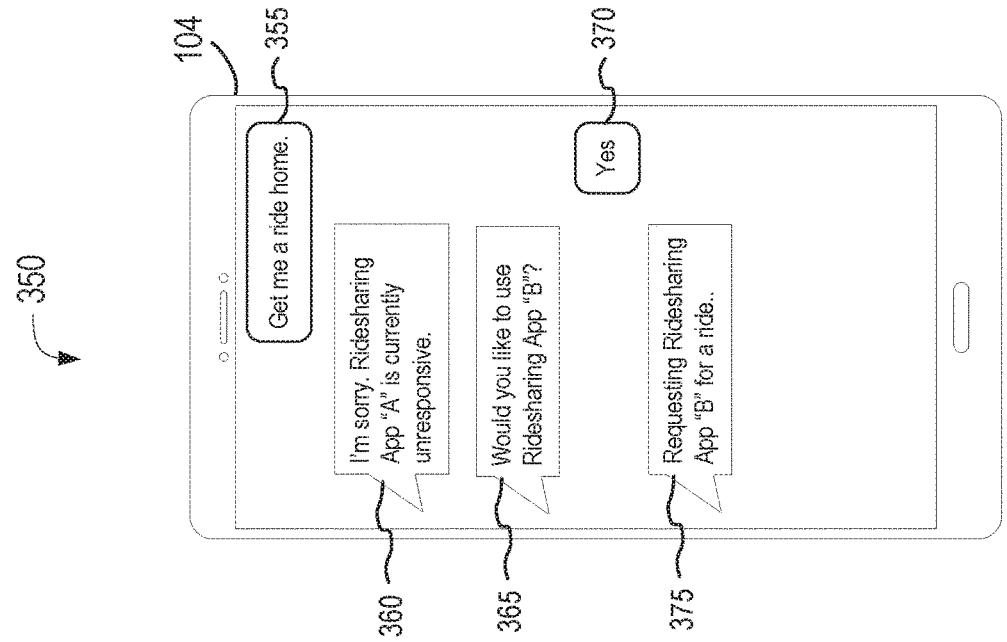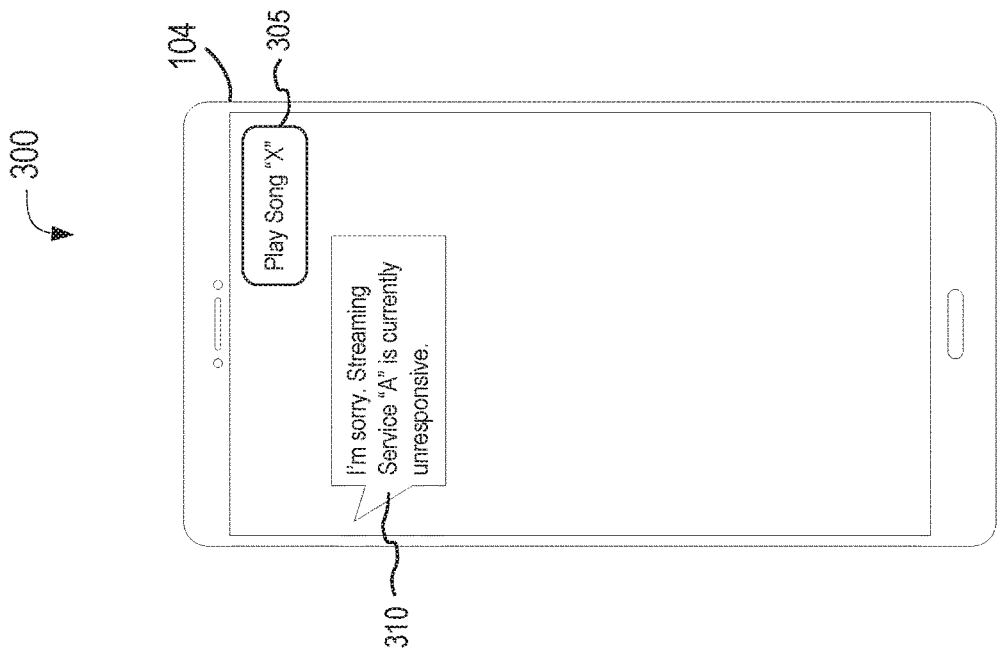
FIG. 3

VERIFYING OPERATIONAL STATUSES OF AGENTS INTERFACING WITH DIGITAL ASSISTANT APPLICATIONS

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response when the responding computing device is at or above its processing capacity, which may result in inefficient bandwidth utilization. A portion of the excessive network transmissions can include transmissions for requests that are not valid requests.

SUMMARY

According to an aspect of the disclosure, a system to determine operational statuses of agents interfacing with digital assistant applications can include a data processing system having one or more processors. A response logger component executed by the data processing system can access a log database. The log database can maintain a plurality of response metrics for an agent service. Each response metric can correspond to a response by the agent service to a first request generated by a digital assistant application responsive to an input audio signal for one of the plurality of functions of an agent interfacing with the digital assistant application. A probe monitor component executed by the data processing system can transmit a second request to the agent service for one of the plurality of functions of the agent and can wait for a second response from the agent service in response the second request. A status evaluator component executed by the data processing system can determine an operational status of the agent service for the agent based on the plurality of response metrics maintained on the log database for the agent and on a time elapsed since the transmission of the second request. An agent manager component executed by the data processing system can cause the digital assistant application to perform an action in interfacing with the agent based on the operational status of the agent.

According to an aspect of the disclosure, a method of determining operational statuses of agents interfacing with digital assistant applications can include accessing the log database maintaining a plurality of response metrics for an agent service. The log database can maintain a plurality of response metrics for an agent service. Each response metric can correspond to a response by the agent service to a first request generated by a digital assistant application responsive to an input audio signal for one of the plurality of functions of an agent interfacing with the digital assistant application. The method can include transmitting a second request to the agent service for one of the plurality of functions of the agent to wait for a second response from the agent service in response the second request. The method can include determining an operational status of the agent service for the agent based on the plurality of response metrics maintained on the log database for the agent and on a time elapsed since the transmission of the second request. The method can include causing the digital assistant application to perform an action in interfacing with the agent based on the operational status of the agent service.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 illustrates a client computing device with request messages and request messages, in accordance with an example of the present disclosure.

DETAILED DESCRIPTION

Figure 1:
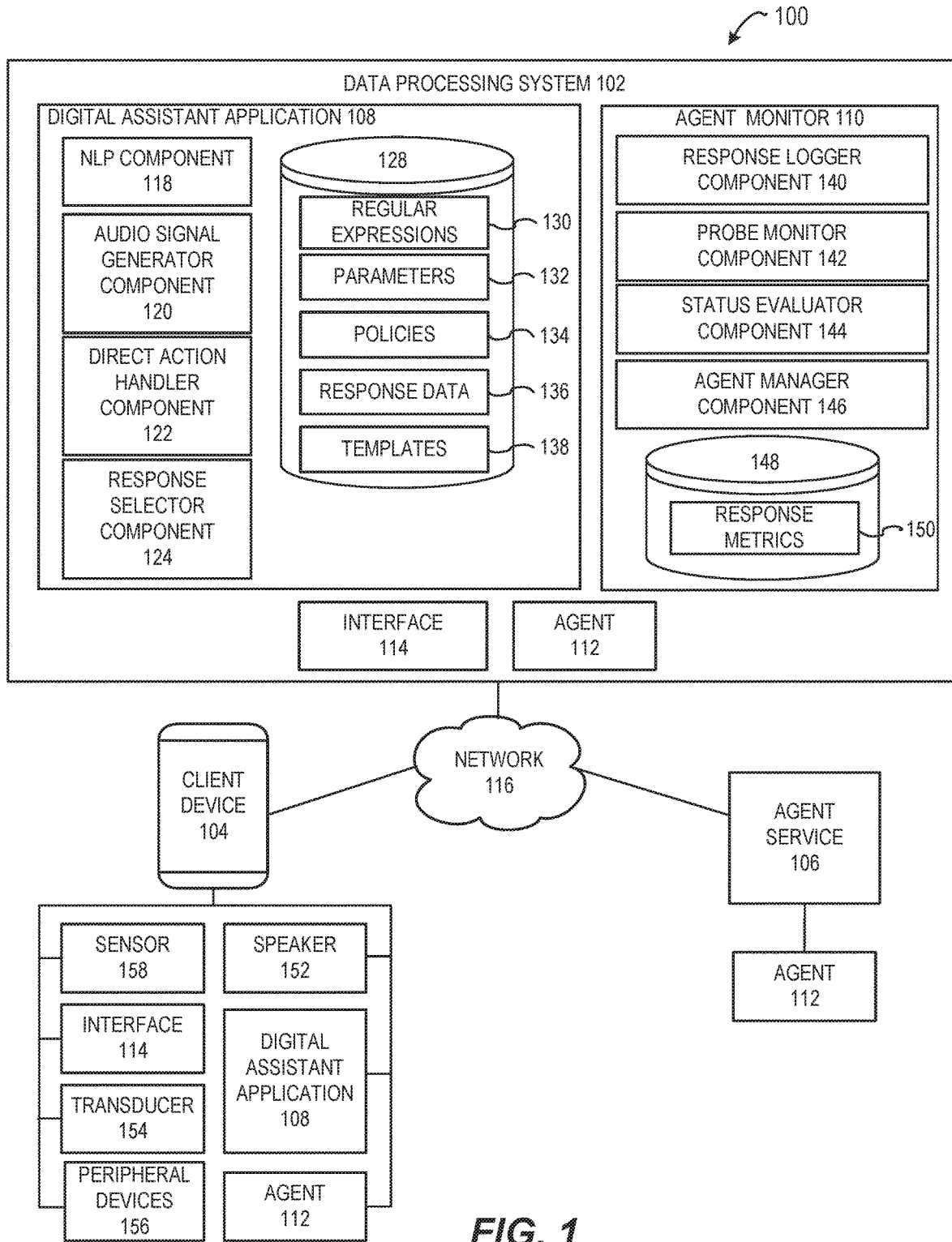
FIG. 1 illustrates a block diagram of an example system to determine operational statuses of agents interfacing with digital assistant applications, in accordance with an example of the present disclosure.

Following below are more detailed descriptions of various concepts related to and implementations of, methods, apparatuses, and systems to determine operational statuses of agents interfacing with digital assistant applications. The various concepts introduced above and discussed in greater detail below may be implemented in any of numerous ways.

A digital assistant application can interface with agents via invoking functions in accordance with application programming interface (API) protocols. The function call can cause the agent to send a request to an agent service to access various resources for carrying out various functionalities. Using these functions, the functionalities of the digital assistant application can be extended. Certain functions can be invoked or performed in response to fulfilling a predefined condition (sometimes referred to an HTTP callback or web hook).

By invoking these functions, however, the performance of the agent service can negatively impact the operations of the digital assistant application interfacing with the agent. First, the function calls for the agent can sometimes fail to execute properly. For example, the function call can result in the agent service crashing and returning a server-side error message (e.g., an HTTP response with a 5xx status code). In addition, the function call itself can also be invalid or improper under the API protocols, and can result in the agent service responding with a client-side error message (e.g., an HTTP response with a 4xx status code). Any error can lead to a breakdown in the interfacing between the digital assistant application and the agent. Second, even if ascertaining the cause of the error were desired, the internal operations of the agent service and the agent can be inaccessible to the digital assistant application. For instance, the digital assistant application can have access to metadata for the agent (e.g., package and listing), but may not have access to the full capabilities of the agent or the agent service. Indexing (sometimes referred to crawling) the agent service to determine the full capabilities of the agent can be difficult to perform in the context of digital assistant applications.

To alleviate the performance of the agent service from detrimentally affecting the operations of the digital assistant application, the present systems and methods can monitor the performance of the agent service and index the capabilities of the agent by analyzing response logs and querying the agent service. To monitor the performance of the agent service, the agent monitor can ping the agent service by sending a request using one of the predefined function calls. The request can be of the same format as a request generated by the digital assistant application interfacing with the agent in response to an input audio signal for one of the functionalities of the agent. The agent monitor can wait for a response from the agent service until a predetermined time. Upon receipt of the response, the agent monitor can parse the response to determine a response metric for the response in reaction to the request. By pinging, the agent monitor can determine the functionalities of the agent and the agent service providing resources to the agent interfacing with the digital assistant application.

In conjunction with the pinging of the agent service, the agent monitor can also access a log database for the agent service. The log database can maintain response metrics for the responses generated by the agent service to requests the digital assistant application running on clients interfacing with the agent. The request can have been generated in response to an input audio signal for one of the functionalities of the agent. The response metric for each response indicating an elapsed time between the response and the corresponding request and an indication of whether the agent service successfully carried out the request, among other measures.

Using the response from the pinging and the response metrics maintained on the log database, the agent monitor can determine an operational status of the agent service indicating whether the agent service is responsive or unresponsive. Based on the operational status, the agent monitor can set or configure the digital assistant application in interfacing with the agent associated with the agent service. When the operational status indicates that the agent service is currently unresponsive, the digital assistant application can be set to present a warning that the agent is unresponsive, in response to receiving an input audio signal for one of the functions of the agent. With the determination of the capabilities of the agent, the digital assistant application can also select an alternative agent that can also carry out the task indicated in the input audio signal. On the other hand, when the operational status indicates that the agent service is currently responsive, the digital assistant application can continue to invoke the agent to access resources provided by the agent service to carry out the task indicated in the input audio signal.

Referring to FIG. 1, depicted is an example system 100 to determine operational statuses of agents interfacing with digital assistant applications. The system 100 can include at least one data processing system 102, one or more client devices 104, and one or more agent services 106. The one or more client devices 104 can be communicatively coupled to the one or more agent services 106, and vice-versa. The at least one data processing system 102, one or more client devices 104, and one or more agent services 106 can be communicatively coupled to one another via the network 116.

The data processing system 102 can include an instance of the digital assistant application 108. The digital assistant application 108 can include a natural language processor (NLP) component 118 to parse audio-based inputs. The digital assistant application 108 can include an audio signal generator component 120 to generate audio-based signals. The digital assistant application 108 can include a direct action handler 122. The digital assistant application 108 can include a response selector component 124 to select responses to audio-based input signals. The NLP component 118, the audio signal generator component 120, the data repository 128, the direction action handler 122, and the response selector component 124 separate from the digital assistant application 108. The data processing system 102 can include a data repository 128. The data repository 128 can store regular expressions 130, parameters 132, policies 134, response data 136, and templates 138. The data processing system 102 can also include an agent monitor 110 and an instance of an agent 112, among others. The agent monitor 110 can include a response logger component 140, a probe monitor component 142, a status evaluator component 144, an agent manager component 146, and a data repository 148. The data repository 148 can store and maintain response metrics 150. The agent monitor 110 can be a separate application. The agent monitor 110 can be a part of the digital assistant application 108. The data processing system 102 can include an instance of one or more agents 112.

The functionalities of the data processing system 102, such as the digital assistant application 108, can be included or otherwise be accessible from the one or more client devices 104. The functionalities of the data processing system 102 may correspond to the functionalities or interface with the digital assistant application 108 executing on the client devices 104. The client devices 104 can each include and execute a separate instance of the one or more components of the digital assistant application 108. The client devices 104 can otherwise have access to the functionalities of the components of the digital assistant application 108 on a remote data processing system 102 via the network 116. For example, the client device 104 can include the functionalities of the NLP component 118 and access the remainder of the components of the digital assistant application 108 via the network 116 to the data processing system 102.

The client devices 104 can each include at least one logic device such as a computing device having a processor to communicate with each other with the data processing system 102 via the network 116. The client devices 104 can include an instance of any of the components described in relation to the data processing system 102. The client devices 104 can include an instance of the digital assistant application 108. The client devices 104 can include a desktop computer, laptop, tablet computer, personal digital assistant, smartphone, mobile device, portable computer, thin client computer, virtual server, speaker-based digital assistant, or other computing device.

The components of the system 100 can communicate over a network 116. The network 116 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 116 can include a wireless link, such as an infrared channel or satellite band. The topology of the network 116 may include a bus, star, or ring network topology. The network 116 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The client device 104 can include, execute, interface, or otherwise communicate with one or more of at least one instance of the digital assistant application 108, at least one instance of the agent 112, at least one sensor 158, at least one transducer 154, and at least one peripheral device 156. The sensor 158 can include, for example, a camera, an ambient light sensor, proximity sensor, temperature sensor, accelerometer, gyroscope, motion detector, GPS sensor, location sensor, microphone, video, image detection, or touch sensor. The transducer 154 can include or be part of a speaker or a microphone. The client device 104 can include an audio driver. The audio driver can provide a software interface to the hardware transducer 154. The audio driver can execute the audio file or other instructions provided by the data processing system 102 to control the transducer 154 to generate a corresponding acoustic wave or sound wave. The peripheral device 156 can include user input/output devices, such as a keyboard, a display, and a headphone, among others. The display can include one or more hardware or software component configured to provide a visual indication or optical output, such as a light emitting diode, organic light emitting diode, liquid crystal display, laser, or display.

The instance of the digital assistant application 108 on the client device 104 can include or be executed by one or more processors, logic array, or memory. The instance of the digital assistant application 108 on the client device 104 can detect a keyword and perform an action based on the keyword. The digital assistant application 108 on the client device 104 can be an instance of the digital assistant application 108 executed at the data processing system 102 or can perform any of the functions of the digital assistant application 108. The instance of the digital assistant application 108 on the client device 104 can filter out one or more terms or modify the terms prior to transmitting the terms as data to the data processing system 102 (e.g., the instance of the digital assistant application 108 on the data processing system 102) for further processing. The instance of the digital assistant application 108 on the client device 104 can convert the analog audio signals detected by the transducer 154 into a digital audio signal and transmit one or more data packets carrying the digital audio signal to the data processing system 102 via the network 116. The instance of the digital assistant application 108 on the client device 104 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The instance of the digital assistant application 108 on the client device 104 can perform pre-filtering or pre-processing on the input audio signal to remove certain frequencies of audio. The pre-filtering can include filters such as a low-pass filter, high-pass filter, or a bandpass filter. The filters can be applied in the frequency domain. The filters can be applied using digital signal processing techniques. The filter can be configured to keep frequencies that correspond to a human voice or human speech, while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The instance of the digital assistant application 108 on the client device 104 can apply the bandpass filter prior to transmitting the input audio signal to the data processing system 102, thereby reducing network bandwidth utilization. However, based on the computing resources available to the client device 104 and the available network bandwidth, it may be more efficient to provide the input audio signal to the data processing system 102 to allow the data processing system 102 to perform the filtering.

The instance of the digital assistant application 108 on the client device 104 can apply additional pre-processing or pre-filtering techniques such as noise reduction techniques to reduce ambient noise levels that can interfere with the natural language processor. Noise reduction techniques can improve accuracy and speed of the natural language processor, thereby improving the performance of the data processing system 102 and manage rendering of a graphical user interface provided via the display.

The client device 104 can be associated with an end user that enters voice queries as audio input into the client device 104 (via the sensor 158 or transducer 154) and receives audio (or other) output from the data processing system 102 or agent services 106 to present, display, or render to the end user of the client device 104. The digital component can include a computer-generated voice that can be provided from the data processing system 102 or the agent service 106 to the client device 104. The client device 104 can render the computer-generated voice to the end user via the transducer 154 (e.g., a speaker). The computer-generated voice can include recordings from a real person or computer-generated language. The client device 104 can provide visual output via a display device communicatively coupled to the client device 104.

The end user that enters the voice queries to the client device 104 can be associated with multiple client devices 104. For example, the end user can be associated with a first client device 104 that can be a speaker-based digital assistant device, a second client device 104 that can be a mobile device (e.g., a smartphone), and a third client device 104 that can be a desktop computer. The data processing system 102 can associate each of the client devices 104 through a common login, location, network, or other linking data. For example, the end user may log into each of the client devices 104 with the same account user name and password.

The client device 104 can include or execute an instance of the agent 112. The client device 104 can include or execute an instance of the agent 112. The agent 112 can include one or more components with similar functionalities as the digital assistant application 108. Instances of the agent 112 can be executed on the data processing system 102 and the agent service 106. The digital assistant application 108 can interface with the agent 112, and vice-versa to carry out predefined functions. The agent 112 can access resources on the agent service 106 in carrying the function indicated in the input audio signal. The client device 104 can receive an input audio signal detected by a sensor 158 (e.g., microphone) of the client device 104. Based on parsing the input audio signal, the digital assistant application 108 can determine which agent 112 to interface with in processing the input audio signal. The input audio signal can include, for example, a query, question, command, instructions, or other statement in a natural language. The input audio signal can include an identifier or name of a third-party (e.g., one of the providers for the agents 112 associated with the agent service 106) to which the question or request is directed. For example, the voice query can include the name of the subscription-based music service (e.g., one of the providers of the agents 112 associated with the agent service 106) in the input audio signal. The digital assistant application 108 can determine that the voice query includes the name of the music service and can identify the agent service 106 and the agent 112 to interface with. For example, the input audio signal can include "Play my music playlist on XYZ Music Service." The music service can provide the audio files associated with the playlist to the client device 104 through the network 116 or to the agent service 106 or the data processing system 102. The agent service 106 or the data processing system 102 can provide the songs associated with the playlist to the client device 104 through the network 116. Upon receipt of the audio files, the agent 112 or the digital assistant application 108 on the client device 104 can playback the audio file. The input audio signal can include one or more predefined keywords referencing a functionality of the third-party (e.g., "ride," "pay," and "airplane"). For example, the voice query of the input audio signal can include "Get me a ride." The digital assistant application 108 can determine that the voice query is referencing the functionality of a ridesharing service, and can forward the voice query to the agent service 106 handling the voice queries for the agent 112. The functionalities of the agent 112 with respect to the agent service 106 and the digital assistant application 108 will be detailed herein below.

The data processing system 102 and the agent service 106 each can include at least one server having at least one processor. For example, the data processing system 102 and the agent service 106 each can include a plurality of servers located in at least one data center or server farm. The data processing system 102 can determine from an audio input signal a request and a trigger keyword associated with the request. Based on the request and trigger keyword, the data processing system 102 can determine whether to forward the audio input signal to the agent service 106 or to process the audio input signal internally. Responsive to the determination that the audio input signal is to be processed internally, the data processing system 102 generate or select response data. The response data can be audio-based or text-based. For example, the response data can include one or more audio files that, when rendered, provide an audio output or acoustic wave. The data within the response data can also be referred to as content items. The response data can include other content (e.g., text, video, or image content) in addition to audio content. Responsive to the determination that the audio input signal is to be forwarded, the data processing system 102 can send the audio input signal to the agent service 106. The agent service 106 can parse the audio input signal to identify a command to execute. The agent service 106 can carry out the command and return a result of the command to the data processing system 102 or the client device 104.

The data processing system 102 and the agent service 106 each can include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 and the agent service 106 each can include servers in a data center that are stored in one or more high-density rack systems, along with associated storage systems, located for example in an enterprise data center. In this way, the data processing system 102 or the agent service 106 with consolidated servers can improve system manageability, data security, the physical security of the system, and system performance by locating servers and high performance storage systems on localized high performance networks. Centralization of all or some of the data processing system 102 or agent service 106 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repositories 128 and 148 and with other computing devices. The agent service 106 can also include at least one processing unit, server, virtual server, circuit, engine, agent, appliance, or other logic device such as programmable logic arrays configured to communicate with a data repository and with other computing devices.

The data processing system 102 can include the data repository 128. The data repository 128 can include one or more local or distributed databases and can include a database management system. The data repository 128 can include computer data storage or memory and can store one or more regular expressions 130, one or more parameters 132, one or more policies 134, response data 136, and templates 138, among other data. The parameters 132, policies 134, and templates 138 can include information such as rules about a voice based session between the client devices 104 and the data processing system 102. The regular expressions 130 can include rules about when the voice-based session between the client devices 104 and the data processing system 102 is to include the agent 112 and the agent service 106. The regular expressions 130, parameters 132, policies 134, and templates 138 can also include information for another digital assistant application 108 received via the interface 114 from another source (e.g., the data processing system 102 and the client devices 104). The response data 136 can include content items for audio output or associated metadata, as well as input audio messages that can be part of one or more communication sessions with the client devices 104.

An application, script, program, or other components that are associated with the data processing system 102 can be installed at the client devices 104. The application can enable the client devices 104 to communicate input audio signals (and other data) to the interface 114 of the data processing system 102.

The data processing system 102 can include at least one computation resource or server. The data processing system 102 can include, interface, or otherwise communicate with at least one interface 114. The data processing system 102 can include, interface, or otherwise communicate with at least one instance of the digital assistant application 108 on the data processing system 102. The instance of the digital assistant application 108 on the data processing system 102 can include, interface, or otherwise communicate with at least one NLP component 118, at least one audio signal generator component 120, and at least one direct action handler component 122. The data processing system 102 can include, interface, or otherwise communicate with at least one digital component selector 120. The data processing system 102 can include, interface, or otherwise communicate with at least one data repository 128. The at least one data repository 128 can include or store, in one or more data structures or databases, regular expressions 130, parameters 132, policies 134, response data 136, and templates 138. The data repository 128 can include one or more local or distributed databases, and can include a database management.

The components of the data processing system 102 can each include at least one processing unit or other logic device such as a programmable logic array engine or module configured to communicate with the database repository 128 or 148. The components of the data processing system 102 can be separate components, a single component, or part of multiple data processing systems 102. The system 100 and its components, such as a data processing system 102, can include hardware elements, such as one or more processors, logic devices, or circuits.

The data processing system 102 can include an interface 114. The interface 114 can be configured, constructed, or operational to receive and transmit information using, for example, data packets. The interface 114 can receive and transmit information using one or more protocols, such as a network protocol. The interface 114 can include a hardware interface, software interface, wired interface, or wireless interface. The interface 114 can be a data interface or a network interface that enables the components of the system 100 to communicate with one another. The interface 114 of the data processing system 102 can provide or transmit one or more data packets that include the action data structure, audio signals, or other data via the network 116 to the client devices 104 or the agent service 106. For example, the data processing system 102 can provide the output signal from the data repository 128 or from the audio signal generator component 120 to the client devices 104. The data processing system 102 can also instruct, via data packet transmissions, the client devices 104 to perform the functions indicated in the action data structure. The output signal can be obtained, generated, transformed to, or transmitted as one or more data packets (or other communications protocol) from the data processing system 102 (or other computing device) to the client devices 104. The interface 114 can facilitate translating or formatting data from one format to another format. For example, the interface 114 can include an application programming interface ("API") that includes definitions for communicating between various components, such as software components.

The data processing system 102 can include an application, script, or program installed at the client device 104, such as the instance of the digital assistant application 108 on the client device 104 to communicate input audio signals to the interface 114 of the data processing system 102 and to drive components of the client computing device to render output audio signals or visual output. The data processing system 102 can receive data packets, a digital file, or other signals that include or identify an input audio signal (or input audio signals). The client device 104 can detect the audio signal via the transducer 154 and convert the analog audio signal to a digital file via an analog-to-digital converter. For example, the audio driver can include an analog-to-digital converter component. The pre-processor component can convert the audio signals to a digital file that can be transmitted via data packets over network 116.

The instance of the digital assistant application 108 on the data processing system 102 of the data processing system 102 can execute or run an NLP component 118 to receive or obtain the data packets including the input audio signal detected by the sensor 158 of the client device 104. The data packets can provide a digital file. The NLP component 118 can receive or obtain the digital file or data packets comprising the audio signal and parse the audio signal. For example, the NLP component 118 can provide for interactions between a human and a computer. The NLP component 118 can be configured with techniques for understanding natural language and enabling the data processing system 102 to derive meaning from human or natural language input. The NLP component 118 can include or be configured with techniques based on machine learning, such as statistical machine learning. The NLP component 118 can utilize decision trees, statistical models, or probabilistic models to parse the input audio signal. The NLP component 118 can perform, for example, functions such as named entity recognition (e.g., given a stream of text, determine which items in the text map to names, such as people or places, and what the type of each such name is, such as person, location (e.g., "home"), or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), or semantic processing (e.g., processing that can occur after identifying a word and encoding its meaning in order to relate the identified word to other words with similar meanings).

The NLP component 118 can convert the input audio signal into recognized text by comparing the input signal against a stored, representative set of audio waveforms (e.g., in the data repository 128) and choosing the closest matches. The set of audio waveforms can be stored in data repository 128 or other database accessible to the data processing system 102. The representative waveforms are generated across a large set of users, and then may be augmented with speech samples from the user. After the audio signal is converted into recognized text, the NLP component 118 matches the text to words that are associated, for example via training across users or through manual specification, with actions that the data processing system 102 can serve. The NLP component 118 can convert image or video input to text or digital files. The NLP component 118 can process, analyze, or interpret image or video input to perform actions, generate requests, or select or identify data structures.

The data processing system 102 can receive image or video input signals, in addition to, or instead of, input audio signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, or machine learning techniques can be collectively referred to as imaging techniques. The data processing system 102 (e.g., the NLP component 118) can be configured with the imaging techniques, in addition to, or instead of, audio processing techniques.

The NLP component 118 can obtain the input audio signal. From the input audio signal, the NLP component 118 can identify at least one request, at least one trigger keyword corresponding to the request, and one or more entities. The request can indicate intent, digital components, or subject matter of the input audio signal. The trigger keyword can indicate a type of action likely to be taken. For example, the NLP component 118 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 118 can parse the input audio signal to identify, determine, retrieve, or otherwise obtain the request and the trigger keyword. For instance, the NLP component 118 can apply a semantic processing technique to the input audio signal to identify the trigger keyword or the request. The NLP component 118 can apply the semantic processing technique to the input audio signal to identify a trigger phrase that includes one or more trigger keywords, such as a first trigger keyword and a second trigger keyword. For example, the input audio signal can include the sentence "Play my favorite song." The NLP component 118 can determine that the input audio signal includes a trigger keyword "play." The NLP component 118 can determine that the request is for the end user's favorite song (a digital component).

The NLP component 118 can determine whether one or more keywords identified from the input audio signal references one of the agents 112. The one or more keywords can include the trigger keyword or the keyword phrase. The one or more keywords identified from the input audio signal can include an agent identifier. The agent identifier can indicate which agent 112 the end user would like to carry out the request. For example, the input audio signal can include "Play song ABC from music service X." In this input audio signal, the phrase "music service X" can be the agent identifier for an agent 112 that is a subscription-based music service. The NLP component 118 can identify the agent identifier from the one or more keywords of the input audio signal. Based on the input audio signal including the agent identifier, the NLP component 118 can determine that the input audio signal references the agent 112. The NLP component 118 can determine that none of the keywords references the agent 112, in response to determining that none of the keywords in the input audio signal includes the agent identifier.

The NLP component 118 can determine whether one or more keywords identified from the input audio signal references a function of at least one of the agents 112. The one or more keywords can include the trigger keyword or the keyword phrase. The trigger keyword or the keyword phrase can reference the function of at least one of the agents 112. The trigger keywords or the keyword phrases referencing the function at least one of the agents 112 can be defined using the regular expression 130 (sometimes referred to as a format). The agent identified for the agent 112 can be defined using the regular expression 130. The regular expression 130 may include a set of predefined keywords for a function can be configured by the agent service 106. The set of predefined keywords can include a function identifier (e.g., "ride" or "play"). The set of predefined keywords can also be maintained on the data repository 128 of the digital assistant application 108. For example, the input audio signal can include the sentence "Get me a ride home." The set of predefined keywords for connecting with driver of a ridesharing application can include "ride" or "take me to," among others. The NLP component 118 can identify the trigger keyword "ride," and can determine that the audio input signal contains keywords referencing the function of the agent 112. The NLP component 118 can compare the one or more keywords identified from the input audio signal with the regular expression 130 for the function of the agent 112. The NLP component 118 can determine a match between at least one keyword of the input audio signal with the regular expression 130 for the function of the agent 112. Based on the match, the NLP component 118 can associate the at least one key word to a function identifier corresponding to the function of the agent 112.

Based on the match, the NLP component 118 can determine that the input audio signal references the agent 112 and the function of the agent 112. In response to determining that the input audio signals references the function of the agent 112, the NLP component 118 can also identify one or more parameters from the keywords of the input audio signal for the function. In the previous example, the word "home" in "Get me a ride home" can be identified as one of the parameters for the function. The NLP component can determine a match between at least one keyword with the regular expressions 130 for the function of multiple agents 112. Which of the multiple agents 112 is selected can be determined based on an operational status of each agent service 106 as determined by the agent monitor 110, as detailed herein below. Based on no match, the NLP component 118 can determine that the input audio signal does not reference any of the functions of the agent 112.

The data processing system 102 can execute or run an instance of the direct action handler component 122. The direct action handler component 122 can execute scripts or programs based on input received from the NLP component 118. The agent service 106 can provide the scripts or programs. The agent service 106 can make the scripts or programs available to the data processing system 102 through an API or webhooks. The direct action handler component 122 can determine parameters or responses to input fields and can package the data into an action data structure. The action data structure can be provided to the data processing system 102 through an API or webhooks. The direct action handler component 122 can transmit the action data structure to the agent service 106 for fulfillment or the data processing system 102 can fulfill the action data structure.

The direct action handler component 122 can generate or select, based on the request or the trigger keyword identified in an input audio signal, data structures for the actions of a thread or conversation. Based on the request parsed by the NLP component 118, the direct action handler component 122 can determine to which of a plurality of agent services 106 the message should be sent. As described above the NLP component 118 can determine that the input audio signal references the agent 112 or the function of the agent 112. The direct action handler component 122 can determine that the input audio signal includes a request for an explicit agent service 106 (e.g., "Order a car with Car Service XYZ," where the request specifically requests the request be fulfilled by Car Service XYZ) or can select from a plurality of agent services 106 can fulfill the request. The direct action handler component 122 can select one agent service 106 from the plurality of agent services 106 based on the operational status of each agent service 106 as determined by the agent monitor 110, as described herein below.

The direct action handler component 122 can package the request into an action data structure for transmission as another request (also sometimes referred to as a message) to the agent service 106. The direct action handler component 122 can transmit the request to the agent service 106 for the agent 112. The direct action handler component 122 can also invoke or call the agent 112 using the request. The request can be generated in accordance with the Hypertext Transfer Protocol (HTTP). The request can include a header and a body. The header of the request can include one or more fields and the body of the request can include the action data structure. The action data structure can include information for completing the request, such as the function identifier and the one or more parameters of the function corresponding to the function identifier for the agent 112 to fulfill. The information can be data that the agent service 106 uses to complete the request. Continuing the above example for a car service request, the information can include a pick up location and a destination location. The direct action handler component 122 can retrieve a template 138 from the repository 128 to determine which fields to include in the action data structure. The direct action handler component 122 can retrieve content from the repository 128 to obtain information for the fields of the data structure. The direct action handler component 122 can populate the fields from the template with that information to generate the data structure. The direct action handler component 122 can also populate the fields with data from the input audio signal or previous input audio signals. The templates 138 can be standardized for categories of agents 112, or can be standardized for specific agent services 106. For example, ride sharing agent services 106 can use the following standardized template 138 to create the data structure: {client_deviceidentifier; authentication_credentials; pick_uplocation; destination_location; no_passengers; service_level}. The standardized template 138 can also include the function identifier and one or more parameters identified in the input audio signal.

The direct action handler component 122 can be configured to expand responses or entities contained in the responses. The direct action handler component 122 can expand entities that the NLP component 118 identifies in the input audio signal. The direct action handler component 122 can expand the entities to convert the entities into a format that the agent service 106 requires for a given field of the action data structures for the agent service 106. The entities can include information that may be ambiguous or unclear to the agent service 106. For example, when the agent service 106 requested a street address, the end user may provide an entity that is the proper name of a location or business. The direct action handler component 122 can automatically generate the expanded entity based on content or preferences the data processing system 102 received from the client device 104. The direct action handler component 122 can generate the expanded entity based on content or preferences the data processing system 102 requests from the client device 104 in a subsequent audio-based input request. For example, the data processing system 102 can receive an input audio signal that includes "Ok, request a car service to pick me up at home." The NLP component 118 can identify the term "home" as an entity that the agent service 106 cannot recognize. For example, the NLP component 118 can identify "home" as a location entity as one of the one or more parameters for the function; however, the location field in the action data structure can require a street address, city, state, and zip code. In this example, the "home" location entity is not in the format requested by the agent service 106. When the end user of the client device 104 previously provided the data processing system 102 with the end user's home address, the direct action handler component 122 can expand "home" into the format requested by field of the service provider device's action data structure (e.g., {street_address:"123 Main St.", city:"Anytown", state:"CA"}). If the end user did not previously provide the data processing system 102 with the end user's home address, the data processing system 102 can generate and transmit an audio-based input request that requests the end user indicate a specific address rather than "home." Expanding the entity prior to transmitting the entity to the agent service 106 can reduce the number of required network transmission because the agent service 106 may not need to request clarifying or additional information after receiving the unexpanded entity.

The agent service 106 for the agent 112 can receive the request from the direct action handler component 122 via the network 116. The request can include the action data structure. The agent service 106 can parse the request to identify the action data structure included in the request from the direct action handler component 122 in accordance to the template 138. The agent service 106 can also have a copy of the template 138. By applying the template 138, the agent service 106 can determine whether the request is valid. In response to the determination that the request is invalid (e.g., improper syntax), the agent service 106 can generate a response indicating an error. The response can be generated in accordance with HTTP, and include an error code indicating that the request is invalid (e.g., an HTTP message with a 4xx status code). From time to time, the agent service 106 can also be inoperative, unavailable, or is otherwise unable to respond to the request from the digital assistant application 108. The agent service 106 can generate the response with an error code indicating that the agent service 106 is inoperative (e.g., an HTTP message with a 5xx status code). The agent service 106 can transmit or provide the response indicating error to the digital assistant application 108.

In response to the determination that the request is valid, the agent service 106 can identify one or more fields, such as the function identifier and the one or more parameters for the function from the action data structure of the request. The agent service 106 can identify the function corresponding to the function identifier. The agent service 106 can execute or carry out the function corresponding to the function using the one or more parameters from the action data structure of the request. For example, if the request from the direct action handler component 122 is to play a specified song, the agent service 106 can access an audio database to retrieve an audio file corresponding to the specified song. If the request from the direct action handler component 122 is for a ridesharing request, the agent service 106 can identify one or more available vehicles in the location identifier in the request and can send a notification to a computing device for one of the available vehicles (e.g., a smartphone) to request ridesharing. In carrying out the function, the agent service 106 can generate a response to the request. The agent service 106 can package the response into an action data structure for transmission to the digital assistant application 108. The response can be generated in accordance with HTTP. The response can include a header and a body. The header of the response can include one or more fields and the body of the response can include the action data. The action data structure can include an indicator for success or failure in carrying out the function. The action data structure can include a response phrases with one or more words for display or for an output audio signal. Based on the execution of the function, the agent service 106 can identify which indicator and which response phrase to include the response to the request from the digital assistant application 108. The agent service 106 can transmit or provide the response to the digital assistant application 108.

Responsive to the receipt of the response from the agent service 106, the audio generator component 120 can parse the response to identify the action data structure. From the action data structure, the audio generator component 120 can identify the one or more keywords of the response phrase. The audio generator component 120 can generate an output audio file based on the one or more words of response phrase in the response from the agent service 106. The audio generator component 120 can play (e.g., via the speaker 152) the output audio file of the one or more words of the response phrase from the agent service 106 in carrying out the function of the agent 112. For example, the audio generator component 120 can play the response phrase for a ridesharing service, "Ride home is en route in five minutes." The digital assistant application 108 can also display the one or more words of the response phrase. The digital assistant application 108 can also forward the response from the agent service 106 to the agent monitor 110, the functionalities of which are detailed herein below.

The response selector component 124 can obtain information from the data repository 128 where the information can be stored as part of the response data 136. The response selector component 124 can query the data repository 128 to select or otherwise identify response phrases e.g., from the response data 136, for an output audio signal. The response selector component 124 can be invoked to select one of the response phrases in the response data 136 by the NLP component 118 and the direct action handler component 122, responsive to the determination that the input audio signal does not reference any agent 112 or any function of the agents 112. The direct action handler component 122 can package the request into an action data structure for transmission as a message to the response selector component 124. The direct action handler component 122 can obtain response data 136 (or parameters 132 or policies 134) from the data repository 128, as well as data received with end user consent from the client devices 104 to determine location, time, user accounts, and logistical or other information in order to reserve a car from the car share service. The response data 136 (or parameters 132 or policies 134) can be included in the action data structure. When the content included in the action data structure includes end user data that is used for authentication, the data can be passed through a hashing function before being stored in the data repository 128. The audio signal generator component 124 can generate or otherwise obtain an audio output signal that includes the response data 136. The data processing system 102 can execute the audio signal generator component 124 to generate or create an output signal corresponding to the response data 136. For example, once a request is fulfilled, the audio signal generator component 120 can generate an audio output signal that includes the phrase "The action was completed."

The agent monitor 110 on the data processing system 102 can execute the response logger component 140. The response logger component 140 can maintain response metrics 150 for each agent service 106 on the data repository 148 (sometimes referred to as a log database). The response logger component 140 can access the data repository 148 to retrieve the response metrics 150. The response metrics 150 for the agent service 106 can include a log of a response by the agent service 106 to a request generated by the digital assistant application 108. The request generated by the digital assistant application 108 can be in response to an input audio signal for one of the functions of the agent 112 interfacing with the digital assistant application 108. As discussed above, the NLP component 118 of the digital assistant application 108 can determine that the one or more keywords identified in the input audio signal references one or more agents 112 or the function of the one or more agents 112. In response to the determination, the direct action handler component 122 of the digital assistant application 108 can generate a request packaged with an action data structure based on the input audio signal and then transmit the request to the agent service 112 to fulfill the request. In response to the request, the agent service 106 can execute the function included in the action data structure of the request from the direct action handler component 122, and can transmit a response back to the digital assistant application 108.

In conjunction, the response logger component 140 can generate the response metrics 150 for each received request at the digital assistant application 108 referencing the agent 112 or a function of the agent 112. In response to the determination that the input audio signal references the agent 112 or one for the functions of the agent 112, the response logger component 140 can start a new entry for the response metrics 150 for the request in the data repository 148. The response logger component 140 can identify a time of receipt of the request. The response logger component 140 can write the receipt time into the response metrics 150 in the data repository 148 for the request. In response to the generation of the action data structure based on the request, the response logger component 140 can identify the agent identifier, the function identifier, the one or more parameters, and other fields, among others. The response logger component 140 can write the agent identifier, the function identifier, the one or more parameters, and fields onto the response metrics 150 for the request in the data repository 148. The response logger component 140 can identify a transmission time of the request sent to the agent service 106. In response to receipt of the response from the agent service 106, the response logger component 140 can parse the response to identify the indicator and the response phrase of the action data structure. The response logger component 140 can identify a time of receipt of the response from the agent 112. The response logger component 140 can write the receipt time of the response from the agent 112 onto the response metrics 150 in the data repository 148.

In tracking the communication of requests and responses between the digital assistant application 108 and the agent 112, the response logger component 140 can generate the response metrics 150 for the response from the agent 112 on the data repository 148. The response metrics 150 can include a response time of the agent service 106, an error rate or error indication in the response, the function carried out by the agent 112, among others. The response logger component 140 can calculate or determine the response time of the agent service 106 between the response by the agent service 106 and the request transmitted by the direct action handler component 122 to the agent service 106. The response logger component 140 can determine the response time of the agent service 106 based on the transmission time of the request from the direct action handler component 122 and the receipt time of the response from the agent service 106. The response logger component 140 can determine the error indication and the function carried out by the agent service 106 by parsing the response from the agent service 106. The response logger component 140 can parse the action data structure of the response from the agent service 106. The response logger component 140 can identify the success indicator and the function from the action data structure. The indicator may specify that the function was successfully carried out by the agent service 106 or resulted in failure. The function may specify which function was requested and carried out by the agent service 106. The response logger component 140 can also parse the response to identify the header and body. The header may include a status code. The response logger component 140 can identify the status code from the header of the response. Based on the status code, the response logger component 140 can determine whether the function was successfully carried out by the agent service 106.

Using the response phrase from the agent 112, the response logger component 140 can determine one or more functions for the agent 112. The response logger component 140 can also parse the body of the response to identify the response phrase. At least some of the functions may not have been predefined in the regular expression 130 by the agent service 106 for the agent 112. The response logger component 140 can be configured with techniques for understanding natural language to derive meaning from human or natural language input. The response logger component 140 can include or be configured with techniques based on machine learning, such as statistical machine learning. The response logger component 140 can utilize decision trees, statistical models, or probabilistic models to parse the response phrase in the response from the agent service 106 generated responsive to the request. The response logger component 140 can perform, for example, functions such as named entity recognition, natural language generation, natural language understanding, machine translation, morphological segmentation question answering, semantic processing, or semantic network.

By deriving the semantic meaning from the response phrase, the response logger component 140 can determine response metrics for the request to the agent service 106. The response logger component 140 can determine or identify a new function for the agent 112 from analysis of the response phrase from the agent service 106. For example, the response phrase of the response from a ridesharing service can include "Would you like to carpool?" in response to the input audio signal "Get me a ride home." From applying machine learning to the response phrase, the response logger component 140 can determine a new function of calling for a "carpool" in connection with "ride." The response logger component 140 can determine whether the request is successfully carried out by the agent 112 based on semantic analysis of the response phrase from the agent service 106. The response logger component 140 can determine that the request was not successfully carried out by the agent 112 based on identifying one or more words in the response phrase indicating that the request was not successfully carried out using a semantic knowledge map. For example, the response phrase can include the words "Sorry. Cannot find song." By applying the semantic knowledge graph, the response logger component 140 can determine that the request was not carried out successfully. The response logger component 140 can determine that the request was not successfully carried out by the agent 112 based on identifying one or more words in the response phrase indicating that the request was successfully carried out using a semantic knowledge map.

The response logger component 140 can identify an alternative agent 112 with similar functions as the agent 112 based on the determined functions for the agent 112. For example, both the agent 112 and the alternative agent 112 can be ridesharing applications. The response logger component 140 can determine the alternative agent 112 as substitutable to the agent 112 based on the functions determined for the agent 112 and the functions determined for the alternative agent 112. By applying machine learning techniques, the response logger component 140 can determine a semantic meaning of the response phrases of the responses from the agent service 106 for the agent 112. The response logger component 140 can also determine a semantic meaning of the response phrases of the responses from another agent service 106 for the alternative agent 112. Using a semantic knowledge graph, the response logger component 140 can determine a semantic proximity measure between the semantic meaning of the response phrases for the agent 112 and the semantic meaning of the response phrases for the alternative agent 112. The semantic knowledge graph can define relationships and semantic distances among words and phrases. Within the semantic knowledge graph, words or phrases with lower semantic distances can be closer to each other in semantic meaning. Conversely, the words or phrases with higher semantic distances can be further to each other in semantic meaning. The response logger component 140 can compare the semantic proximity measure to a threshold distance. The response logger component 140 can determine that the semantic proximity measure is greater than or equal to the threshold distance. Responsive to the determination, the response logger component 140 can determine that the agent 112 is not substitutable with the alternative agent 112. The response logger component 140 can determine that the semantic proximity measure is less than the threshold distance. Responsive to the determination, the response logger component 140 can determine that the agent 112 is substitutable with the alternative agent 112.

The agent monitor 110 can be invoked by the digital assistant application 108. Responsive to determining that the input audio signal references the agent 112, the direct action handler component 122 of the digital assistant application 108 can provide or transmit the request to the agent monitor 110 and to the agent service 106. In response to receipt of the request, the agent monitor 110 can perform the functionalities of the response logger component 140, the probe monitor component 142, the status evaluator component 144, and the agent manager component 146. The agent monitor 110 can also perform the functionalities of the response logger component 140, the probe monitor component 142, the status evaluator component 144, and the agent manager component 146 in accordance to a predetermined schedule. The predetermined schedule can specify a set of times (e.g., intervals of every 15 minutes, 1 hour, or 1 day).

The agent monitor 110 on the data processing system 102 can execute the probe monitor component 142. The probe monitor component 142 can generate a ping request to transmit to the agent service 106. The ping request can serve as a dummy request corresponding to a sample input audio signal to instrument or test the operational status and performance of the agent service 106 providing resources for the agent 112. The ping request may include a function identifier for one of the functions of the agent 112 to be carried. The ping request can also include one or more parameters for carrying out the function. The probe monitor component 142 can access the data repository 148 to identify the response metrics 150 maintained therein. The probe monitor component 142 can select one of the responses logged in the data repository to select the function identifier and the one or more parameters for the ping request. The probe monitor component 142 can also select a predefined function identifier and one or more parameters in generating the ping request. The probe monitor component 142 can package the ping request into an action data structure for transmission to the agent service 106. The action data structure can include information for completing the request, such as the function identifier and the one or more parameters of the function corresponding to the function identifier for the agent 112 to fulfill. The information can be data that the agent service 106 uses to complete the request. The probe monitor component 142 can retrieve a template (e.g., template 138 from the data repository 128) to determine which fields to include in the action data structure. The probe monitor component 142 can populate the fields from the template with that information to generate the data structure. With the generation of the ping request, the probe monitor component 142 can transmit the ping request to the agent service 106 via the network 116. Upon transmission of the ping request, the probe monitor component 142 can identify a time of transmission of the ping request to the agent service 106. Subsequent to transmitting the ping request, the probe monitor component 142 can wait for a response to the ping request from the agent service 106.

The agent service 106 can receive the ping request from the probe monitor component 142. The agent service 106 can parse the ping response to identify action data structure. The agent service 106 can also have a copy of the template 138. By applying the template 138, the agent service 106 can determine whether the request is valid. In response to the determination that the request is invalid (e.g., improper syntax), the agent service 106 can generate a response indicating an error. The response can be generated in accordance with HTTP, and include an error code indicating that the request is invalid (e.g., an HTTP message with a 4xx status code). When the agent service 106 is inoperative, the agent service 106 can generate the response with an error code indicating that the agent service 106 is inoperative (e.g., an HTTP message with a 5xx status code). The agent service 106 can transmit or provide the response indicating error to the probe monitor component 142. When there is no error, the agent service 106 can identify one or more fields, such as the function identifier and the one or more parameters for the function from the action data structure of the ping request. The agent service 106 can identify the function corresponding to the function identifier. The agent service 106 can execute or carry out the function corresponding to the function using the one or more parameters from the action data structure of the request. In carrying out the function, the agent service 106 can generate a response (sometimes referred to as a ping response) to the ping request. The agent service 106 can package the response into an action data structure for transmission to the probe monitor component 142. The ping response can be generated in accordance with HTTP. The ping response can include a header and a body. The header of the ping response can include one or more fields and the body of the response can include the action data. The action data structure can include an indicator for success or failure in carrying out the function. The action data structure can include a response phrases with one or more words for display or for an output audio signal. Based on the execution of the function, the agent service 106 can identify which indicator and which response phrase to include in the ping response. The agent service 106 can transmit or provide the ping response to the probe monitor component 142.

Subsequently, the probe monitor component 142 can receive the ping response from the agent service 106. The probe monitor component 142 can repeat functionalities similar to the functionalities of the response logger component 140 with respect to the response from the agent service 106 generated in response to the ping request. The probe monitor component 142 can generate the response metrics based on the ping response generated by the agent 112 in response to the ping request. In response to the determination that the input audio signal references the agent 112 or one for the functions of the agent 112, the probe monitor component 142 can start a new entry for the response metrics for the ping request in the data repository 148. The probe monitor component 142 can identify a time of receipt of the ping request. The probe monitor component 142 can write the receipt time into the response metrics in the data repository 148 for the ping request. In response to the generation of the action data structure based on the ping request, the probe monitor component 142 can identify the agent identifier, the function identifier, the one or more parameters, and other fields, among others. The probe monitor component 142 can write the agent identifier, the function identifier, the one or more parameters, and fields onto the response metrics for the ping request in the data repository 148. The probe monitor component 142 can identify a transmission time of the ping request sent to the agent service 106. In response to receipt of the ping response from the agent service 106, the probe monitor component 142 can parse the ping response to identify the indicator and the response phrase of the action data structure. The probe monitor component 142 can identify a time of receipt of the ping response from the agent 112. The probe monitor component 142 can write the receipt time of the ping response from the agent 112 onto the response metrics in the data repository 148.

The response metrics for the ping response to the ping request can include a response time of the agent service 106, an error rate or error indication in the response, the function carried out by the agent 112, among others. The probe monitor component 142 can calculate or determine the response time of the agent service 106 between the ping response by the agent service 106 and the ping request to the agent service 106. The probe monitor component 142 can determine the response time of the agent service 106 based on the transmission time of the ping request and the receipt time of the ping response from the agent service 106. The probe monitor component 142 can determine the error indication and the function carried out by the agent service 106 by parsing the ping response from the agent service 106. The probe monitor component 142 can parse the action data structure of the ping response from the agent service 106. The probe monitor component 142 can identify the success indicator and the function from the action data structure. The indicator may specify that the function was successfully carried out by the agent service 106 or resulted in failure. The function may specify which function was requested and carried out by the agent service 106. The probe monitor component 142 can also parse the ping response to identify the header and body. The header may include a status code. The probe monitor component 142 can identify the status code from the header of the ping response. Based on the status code, the probe monitor component 142 can determine whether the function was successfully carried out by the agent service 106.

Using the response phrase from the agent 112 generated in response to the ping request, the probe monitor component 142 can determine one or more functions for the agent 112. The probe monitor component 142 can also parse the body of the ping response to identify the response phrase. At least some of the functions may not have been predefined in the regular expression 130 by the agent service 106 for the agent 112. The probe monitor component 142 can be configured with techniques for understanding natural language to derive meaning from human or natural language input. The probe monitor component 142 can include or be configured with techniques based on machine learning, such as statistical machine learning. The probe monitor component 142 can utilize decision trees, statistical models, or probabilistic models to parse the response phrase from the agent service 106 generated in response to the ping request. The probe monitor component 142 can perform, for example, functions such as named entity recognition, natural language generation, natural language understanding, machine translation, morphological segmentation question answering, semantic processing, or semantic network.

By deriving the semantic meaning from the response phrase, the probe monitor component 142 can determine response metrics for the request to the agent service 106. The probe monitor component 142 can determine or identify a new function for the agent 112 from analysis of the response phrase from the agent service 106. For example, the response phrase of the ping response from a ridesharing service can include "Would you like to luxury car for your ride?" in response to the input audio signal "Get me a ride home." From applying machine learning to the response phrase, the probe monitor component 142 can determine a new function of calling for a "luxury car" in connection with "ride." The probe monitor component 142 can determine whether the request is successfully carried out by the agent 112 based on semantic analysis of the response phrase from the agent service 106. The probe monitor component 142 can determine that the request was not successfully carried out by the agent 112 based on identifying one or more words in the response phrase indicating that the request was not successfully carried out using a semantic knowledge map. For example, the response phrase can include the words "Sorry. Cannot find the song." By applying the semantic knowledge graph, the probe monitor component 142 can determine that the request was not carried out successfully. The probe monitor component 142 can determine that the request was not successfully carried out by the agent 112 based on identifying one or more words in the response phrase indicating that the request was successfully carried out using a semantic knowledge map.

The probe monitor component 142 can identify an alternative agent 112 with similar functions as the agent 112 based on the determined functions for the agent 112. For example, both the agent 112 and the alternative agent 112 can be ridesharing applications. The probe monitor component 142 can determine the alternative agent 112 as substitutable to the agent 112 based on the functions determined for the agent 112 and the functions determined for the alternative agent 112. By applying machine learning techniques, the probe monitor component 142 can determine a semantic meaning of the response phrases of the ping responses from the agent service 106 for the agent 112. The probe monitor component 142 can also determine a semantic meaning of the response phrases of the ping responses from another agent service 106 for the alternative agent 112. Using a semantic knowledge graph, the probe monitor component 142 can determine a semantic proximity measure between the semantic meaning of the response phrases for the agent 112 and the semantic meaning of the response phrases for the alternative agent 112. The semantic knowledge graph can define relationships and semantic distances among words and phrases. Within the semantic knowledge graph, words or phrases with lower semantic distances can be closer to each other in semantic meaning. Conversely, the words or phrases with higher semantic distances can be further to each other in semantic meaning. The probe monitor component 142 can compare the semantic proximity measure to a threshold distance. The probe monitor component 142 can determine that the semantic proximity measure is greater than or equal to the threshold distance. Responsive to the determination, the probe monitor component 142 can determine that the agent 112 is not substitutable with the alternative agent 112. The probe monitor component 142 can determine that the semantic proximity measure is less than the threshold distance. Responsive to the determination, the probe monitor component 142 can determine that the agent 112 is substitutable with the alternative agent 112.

In waiting for the ping response from the agent service 106, the probe monitor component 142 can maintain a timer to measure, identify, or determine a time elapsed since the transmission of the ping request to the agent service 106. The probe monitor component 142 can compare the time elapsed since the transmission to a predefined time period. The predefined time window may correspond to a network timeout event indicating that the agent service 106 is inoperative or otherwise unable to respond to the ping request. The probe monitor component 142 can determine that the elapsed time since transmission is greater than or equal to the predefined time period, without having received the ping response from the agent service 106. Responsive to the determination that the time elapsed is greater than or equal to the predefined time period, the probe monitor component 142 can generate response metrics for the ping request indicating that the agent service 106 failed to respond. The probe monitor component 142 can also determine that a timeout event has occurred at the agent service 106 in response to the ping request. The probe monitor component 142 can determine that the elapsed time is less than the predefined time period, having received the ping response prior to the predefined time period. Responsive to the determination that the elapsed time is less than the predefined time period, the probe monitor component 142 can generate the response metrics for the agent service 106 based on the received ping response.

The probe monitor component 142 can repeat the above described functionalities over a plurality of ping requests.

The agent service 106 can also repeat the above described functionalities over the plurality of ping requests. The probe monitor component 142 can generate a plurality of ping requests for transmission to the agent service 106. The plurality of ping requests can be generated successively one after the after. Each ping request can include a function identifier and one or more parameters different from another ping request. In this manner, various functions of the agent 112 can be tested. The probe monitor component 142 can transmit each ping request to the agent service 106. The probe monitor component 142 can maintain a counter for a number of ping request transmitted to the agent service 106. Each time one ping request is transmitted, the probe monitor component 142 can increment the counter. The probe monitor component 142 can compare the number of ping requests transmitted to a predefined maximum number. The probe monitor component 142 can determine that the number of transmitted ping requests is greater than or equal to the predefined maximum number. Responsive to the determination, the probe monitor component 142 can halt transmission of additional ping requests to the agent service 106. The probe monitor component 142 can determine that the number of transmitted ping requests is less than the predefined maximum number. Responsive to the determination, the probe monitor component 142 can continue the generation and transmission of additional ping requests to the agent service 106.

Subsequently, for at least some of the ping requests transmitted, the probe monitor component 142 can receive the ping response generated by the agent service 106. Each time one ping response is received, the probe monitor component 142 can generate response metrics for the ping response (e.g., the ping response time, the error indicator, or the function identifier). The probe monitor component 142 can update the response metrics 150 maintained on the data repository 148 using the response metrics generated for the ping responses. The probe monitor component 142 can maintain a counter for a number of ping responses received from the agent service 106 in response to the transmission of the ping request. The probe monitor component 142 can compare the number of ping responses received from the agent service 106 to a predefined maximum number. The probe monitor component 142 can determine that the number of ping responses is greater than or equal to the predefined maximum number. Responsive to the determination, the probe monitor component 142 can halt transmissions of additional ping requests to the agent service 106. The probe monitor component 142 can also aggregate the response metrics generated for the ping responses received from the agent service 106 in response to the ping requests. The probe monitor component 142 can determine that the number of ping responses is less than the predefined maximum number. Responsive to the determination, the probe monitor component 142 can generate and transmit additional ping requests to the agent service 106.

The agent monitor 110 on the data processing system 102 can execute the status evaluator component 144. The status evaluator component 144 can determine an operational status of the agent service 106 for the agent 112 based on the response metrics 150 for the agent service 106. The status evaluator component 144 can access the response metrics 150 for the agent service 106. The status evaluator component 144 can determine the operational status of the agent service 106 for the agent 112 further based on the elapsed time since the transmission of the second request. The operational status can indicate whether the agent service 106 is responsive (also referred to as operative, active, or enabled) or unresponsive (also referred to as inoperative, inactive, or disabled). The operational status can also be specific to one of the functions of the agent 112.

The status evaluator component 144 can determine an aggregate response metric for the agent service 106 using the response metrics 150 maintained on the data repository 148 and the time elapsed since the transmission the ping request. The aggregate response metric can also be determined by the status evaluator component 144 based on the response metric for the response generated by the agent service 106 responsive to the ping request. The aggregate response metric can also be determined by the status evaluator component 144 based on the response metrics for the plurality of responses generated by the agent service 106 responsive to the plurality of ping requests. The aggregate response metric can include an average response time or an error rate of the agent service 106, among others, or a combination thereof. The status evaluator component 144 can compare the aggregate response metric to a threshold response metric. The threshold response metric can correspond to or can represent the response metric at which the agent service 106 is considered to be unresponsive or responsive. The status evaluator component 144 can determine that the aggregate response metric is greater than or equal to the threshold response metric. For example, the status evaluator component 144 can determine that the response time or the error rate of the agent service 106 is greater than the tolerated response time or tolerated error rate. Responsive to the determination, the status evaluator component 144 can determine the operational status of the agent service 106 as unresponsive. The status evaluator component 144 can determine that the aggregate response metric is less than the threshold response metric. For example, the status evaluator component 144 can determine that the response time or the error rate of the agent service 106 is less than the tolerated response time or tolerated error rate. Responsive to the determination, the status evaluator component 144 can determine the operational status of the agent service 106 as responsive.

In determining the operational status of the agent service 106 for the agent 112, the status evaluator component 144 can filter the response metrics 150 maintained on the data repository 148 based on the response from the agent service 106 generated in response to the ping request. The status evaluator component 144 can access the data repository 148 to retrieve the response metrics 150. The status evaluator component 144 can identify a subset of the response metrics 150 based on the response from the agent service 106 generated responsive to the ping request. The status evaluator component 144 can parse the response from the agent service 106 generated in response to the ping request to identify the action data structure. The status evaluator component 144 can parse the action data structure to identify the function identifier. The status evaluator component 144 can also identify the function identifier from the action data structure of the ping request transmitted to the agent service 106. The status evaluator component 144 can traverse through the log of responses for the response metrics 150 maintained on the data repository 148. For each response, the status evaluator component 144 can parse the response to identify the function identifier performed by the agent service 106. The status evaluator component 144 can compare the function identifier of the response from the data repository 148 with the function identifier of the response generated in response to the ping request. The status evaluator component 144 can determine that the function identifier of the response from the data repository 148 matches with the function identifier of the response generated in response to the ping request. In response to the determination of the match, the status evaluator component 144 can include the response metrics 150 for the request as part of the subset of the response metrics 150 to be used in determining the operational status. The status evaluator component 144 can determine that the function identifier of the response from the data repository 148 does not match with the function identifier of the response generated in response to the ping request. With either determination, the status evaluator component 144 can continue traverse the response metrics 150 maintained on the data repository 148.

Using the subset of response metrics 150, the status evaluator component 144 can determine the aggregate response metric for the function of the agent 112. The aggregate response metric can include an average response time or an error rate of the agent service 106 in carrying out the function corresponding to the function identifier, among others, or a combination thereof. The status evaluator component 144 can compare the aggregate response metric to a threshold response metric. The threshold response metric can correspond to or can represent the response metric at which the agent service 106 is considered to be unresponsive or responsive in carrying out the function corresponding to the function identifier. The status evaluator component 144 can determine that the aggregate response metric is greater than or equal to the threshold response metric. For example, the status evaluator component 144 can determine that the response time or the error rate of the agent service 106 is greater than the tolerated response time or tolerated error rate. Responsive to the determination, the status evaluator component 144 can determine the operational status of the agent service 106 in carrying out the function corresponding to the function identifier as unresponsive. The status evaluator component 144 can determine that the aggregate response metric is less than the threshold response metric. For example, the status evaluator component 144 can determine that the response time or the error rate of the agent service 106 is less than the tolerated response time or tolerated error rate. Responsive to the determination, the status evaluator component 144 can determine the operational status of the agent service 106 as responsive in carrying out the function corresponding to the function identifier.

The status evaluator component 144 can be configured with techniques for understanding natural language to derive meaning from human or natural language input. The status evaluator component 144 can include or be configured with techniques based on machine learning, such as statistical machine learning. The status evaluator component 144 can utilize decision trees, statistical models, or probabilistic models to parse the response phrase from the agent service 106 generated in response phrases for the response metrics 150. The status evaluator component 144 can perform, for example, functions such as named entity recognition, natural language generation, natural language understanding, machine translation, morphological segmentation question answering, semantic processing, or semantic network.

By applying machine learning techniques, the status evaluator component 144 can determine a semantic meaning of the response phrases of the responses from the agent service 106 for the agent 112 generated in response to the ping requests. The status evaluator component 144 can also determine a semantic meaning for each of the response phrases of the responses from the responses maintained in the data repository 148. Using a semantic knowledge graph, the status evaluator component 144 can determine a semantic proximity measure between the semantic meaning of the response phrases for the agent 112 generated in response to the ping request and the semantic meaning of the response phrases for the responses maintained in the data repository 148. The semantic knowledge graph can define relationships and semantic distances among words and phrases. Within the semantic knowledge graph, words or phrases with lower semantic distances can be closer to each other in semantic meaning. Conversely, the words or phrases with higher semantic distances can be further to each other in semantic meaning. The status evaluator component 144 can compare the semantic proximity measure to a threshold distance. The status evaluator component 144 can determine that the semantic proximity measure is greater than or equal to the threshold distance. Responsive to the determination, the status evaluator component 144 can determine that the response phrases generated in response to the ping request is semantically dissimilar from the response phrases maintained on the data repository 148. The status evaluator component 144 can also include the response metrics 150 for the response determined to be semantically similar into the subset of the response metrics 150 to be used in determining the operational status of the agent service 106. The status evaluator component 144 can determine that the semantic proximity measure is less than the threshold distance. Responsive to the determination, the status evaluator component 144 can determine that the response phrases generated in response to the ping request is semantically similar from the response phrases maintained on the data repository 148. The status evaluator component 144 can continue to traverse through the responses maintained on the data repository 148.

Using the subset of response metrics 150, the status evaluator component 144 can determine the aggregate response metric for the function of the agent 112 as indicated with the semantically similar response phrases. The aggregate response metric can include an average response time or an error rate of the agent service 106 in carrying out the function corresponding to the function identifier, among others, or a combination thereof. The status evaluator component 144 can compare the aggregate response metric to a threshold response metric. The threshold response metric can correspond to or can represent the response metric at which the agent service 106 is considered to be unresponsive or responsive in carrying out the function. The status evaluator component 144 can determine that the aggregate response metric is greater than or equal to the threshold response metric. For example, the status evaluator component 144 can determine that the response time or the error rate of the agent service 106 is greater than the tolerated response time or tolerated error rate. Responsive to the determination, the status evaluator component 144 can determine the operational status of the agent service 106 in carrying out the function as unresponsive. The status evaluator component 144 can determine that the aggregate response metric is less than the threshold response metric. For example, the status evaluator component 144 can determine that the response time or the error rate of the agent service 106 is less than the tolerated response time or tolerated error rate. Responsive to the determination, the status evaluator component 144 can determine the operational status of the agent service 106 as responsive in carrying out the function.

The agent monitor 110 on the data processing system 102 can execute the agent manager component 146. The agent manager component 146 can configure, set, or otherwise cause the digital assistant application 108 to perform an action in interfacing with the agent 112 based on the operational status of the agent service 106. The agent manager component 146 can generate and provide a configuration instruction to the digital assistant application 108 based on the operational status of the agent service 106. The configuration instruction can specify which action the digital assistant application 108 is to perform in interfacing with the agent 112. When the operational status indicates that the agent service 106 is responsive, the agent manager component 146 can configure the digital assistant application 108 to continue invoking the agent service 106 for the agent 112 identified as referenced in the input audio signal. The action to be performed by the digital assistant application 108 can include continuing operations (e.g., invocation of the agent service 106) in interfacing with the agent 112. When the operational status indicates that the agent service 106 is unresponsive, the agent manager component 146 can configure the digital assistant application 108 not to invoke the agent service 106 for the agent 112 identified as referenced in the input audio signal. The action to be performed by the digital assistant application 108 can include termination of the invocation of the agent service 106 in response to receiving an input audio signal referencing the agent 112 or one of the functions performed by the agent 112. The action to be performed by the digital assistant application 108 can include an output presenting the operational status of the agent service 106 (e.g., as an audio output signal via the speaker 152 or as a text content item on the display). The action can also include presenting one or more alternative agents 112 to carry out the function in response to receipt of the input audio signal referencing the original agent 112. As previously discussed, each alternative agent 112 can be determined by the response logger component 140 or the probe monitor component 142 as substitutable with the original agent 112.

The agent manager component 146 can identify the operational status of the agent service 106 as responsive. Responsive to identification, the agent manager component 146 can configure, set, or cause the digital assistant application 108 to continue invocation of the agent 112 in response to subsequent audio input signals referencing one of the functions of the agent 112. The agent manager component 146 can transmit the configuration instruction indicating that the agent 112 is responsive. The agent manager component 146 can perform no action at all to maintain the digital assistant application to continue invoking the agent 112 in processing audio input signals referencing one of the functions of the agent 112. With the configuration of the digital assistant application 108 by the agent manager component 146, the NLP component 118 can receive or obtain the data packets including the input audio signal. Using machine learning techniques, the NLP component 118 can determine that the input audio signal is referencing the agent 112 or a function to be carried out by the agent 112. The direct action handler component 122 can generate an action data structure using the input audio signal as part of a request. The direct action handler component 122 can transmit the action data structure to the agent service 106. The agent service 106 can carry out the function indicated in the request, and can transmit a response back to the digital assistant application 108.

Conversely, the agent manager component 146 can identify the operational status of the agent service 106 as unresponsive. Responsive to identification, the agent manager component 146 can configure, set, or cause the digital assistant application 108 to present an output indicating the operational status of the agent service 106 (e.g., as an audio output signal via the speaker 152 or as a text content item on the display). The agent manager component 146 can transmit the configuration instruction. The configuration instruction can indicate that the digital assistant application 108 is to present that the operational status of the agent 112 as unresponsive. With the configuration of the digital assistant application 108 by the agent manager component 146, the NLP component 118 can receive or obtain the data packets including the input audio signal. Using machine learning techniques, the NLP component 118 can determine that the input audio signal is referencing the agent 112 or a function to be carried out by the agent 112. Responsive to the determination, the response selector component 124 can identify the operational status of the agent 112 as unresponsive. Based on the identification, the response selector component 124 can select response data 136 indicating the agent 112 is unavailable. The audio signal generator component 120 can also generate an audio output signal using the response data 136 indicating that the agent 112 is unavailable. For example, the agent monitor 110 may have determined the operational status of a subscription music service agent as unresponsive and configured the digital assistant application 108 accordingly. When the digital assistant application 108 receives the audio input signal with the voice query "Play song X from music service A" is referencing the subscription music service agent, the text content item and an output voice signal stating "Music service A is currently down" can be presented.

In addition, in response to identifying the agent service 106 for the agent 112 as unresponsive, the agent manager component 146 can also configure, set, or cause the digital assistant application 108 to present an alternative agent 112 to carry out the function in response to receipt of the input audio signal referencing the original agent 112. The agent manager component 146 can transmit the configuration instruction. The configuration instruction can include one or more alternative agents 112 to carry out the function. As previously discussed, the response logger component 140 or the probe monitor component 142 can determine an alternative agent 112 with similar functions as the agent 112 based on the determined functions for the agent 112. The agent manager component 146 can also identify the one or more alternative agents 112. For each alternative agent 112, the agent manager component 146 can identify the operational status of the agent service 106 for the alternative agent 112 determined by the status evaluator component 144. When the operational status of the agent service 106 for the alternative agent 112 is identified as responsive, the agent manager component 146 can include an agent identifier for the alternative agent 112 into the configuration instructions to provide to the digital assistant application 108.

With the configuration of the digital assistant application 108 by the agent manager component 146, the NLP component 118 can receive or obtain the data packets including the input audio signal. Using machine learning techniques, the NLP component 118 can determine that the input audio signal is referencing the agent 112 or a function to be carried out by the agent 112. Responsive to the determination, the response selector component 124 can identify the operational status of the agent 112 as unresponsive. Based on the identification, the response selector component 124 select response data 136 indicating the agent 112 is unavailable based on the configuration. Using the configuration instruction, the response selector component 124 can also select response data 136 indicating the one or more alternative agents 112 to carry out the function. The audio signal generator component 120 can generate an audio output signal using the response data 136 indicating that the agent 112 is unavailable. The audio signal generator component 120 can also generate an audio output signal using the response data 136 indicating the one or more alternative agents 112 to carry out the function.

For example, the agent monitor 110 may have determined the operational status of an agent service 106 for a ridesharing service "A" as unresponsive and the operational statuses of the agent services 106 for ridesharing services "B" and "C" as responsive. Using the determination, the agent monitor 110 can configure the digital assistant application 108 accordingly. When the digital assistant application 108 receives the audio input signal with the voice query "Get me a ride home" is referencing the agent 112 for the ridesharing service, the digital assistant application 108 can present a text content item and an output voice signal stating "Ridesharing app 'A' is down" and "Would you like to try Ridesharing app 'B' or 'C?'" After presenting the audio output signal or the text content item, the NLP component 118 can receive a subsequent input audio signal. For example, the NLP component 118 can receive the input audio signal, "App 'B' Please." Using machine learning techniques, the NLP component 118 can identify which of the alternative agents 112 the subsequent input audio signal is referring to. The direct action handler 122 can generate an action data structure using the subsequent input audio signal and can provide the action data structure as a request to the agent service 106. The agent service 106 can carry out the function indicated in the initial request, and can transmit a response back to the digital assistant application 108.

Figure 2:
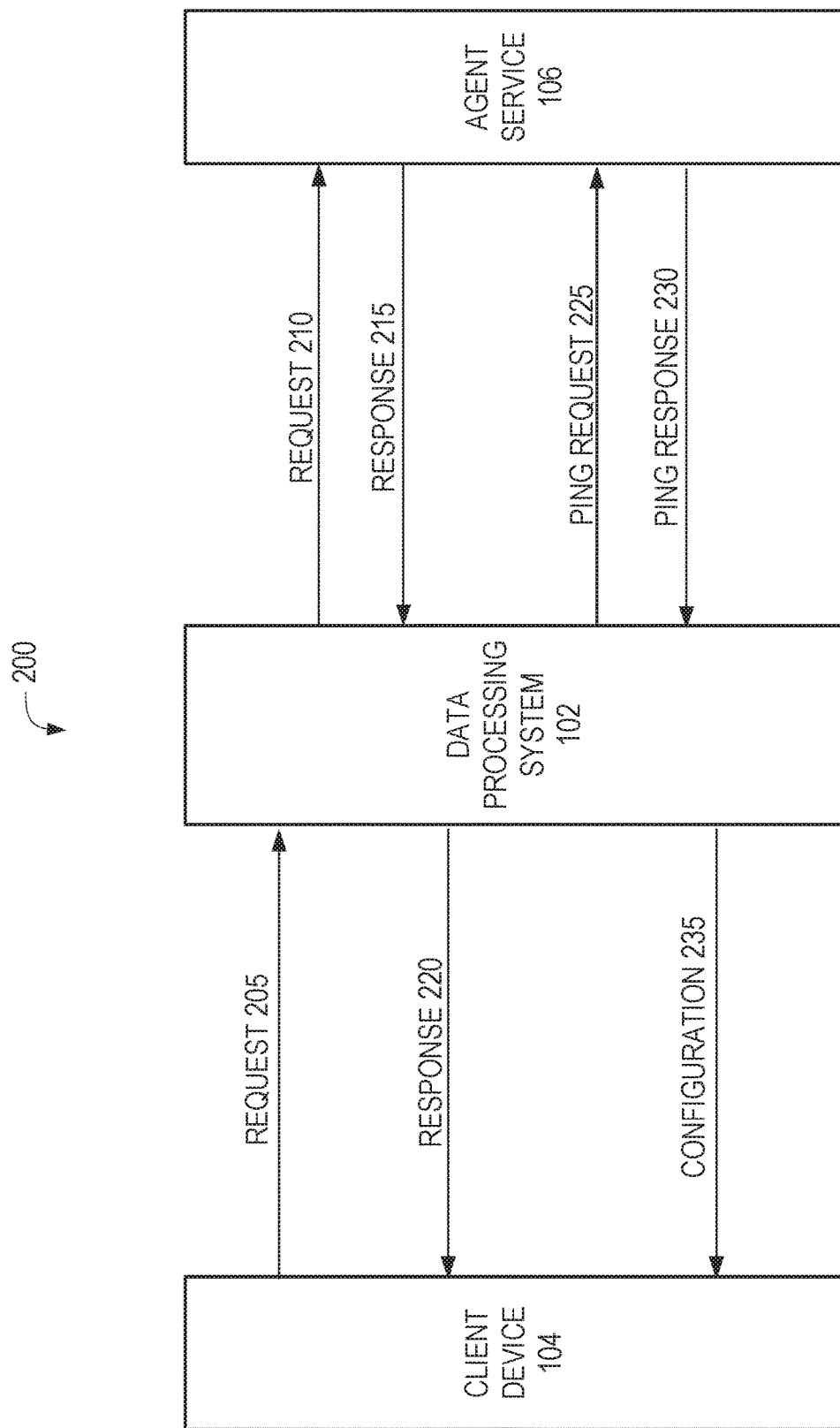
FIG. 2 illustrates a sequence diagram of an example data flow to determine operational statuses of agents interfacing with the digital assistant applications in the system illustrated in FIG. 1, in accordance with an example of the present disclosure.

Referring now to FIG. 2, depicted is a sequence diagram of an example data flow 200 to determine operational statuses of agents 112 interfacing with the digital assistant application 108 in the system illustrated in FIG. 1. The data flow 200 can be implemented or performed by the system 100 described above in conjunction with FIG. 1 or system 600 detailed below in conjunction with FIG. 6. The data flow 200 an include communications in the form of packets (e.g., HTTP messages) among the client device 104, the data processing system 102, and the agent service 106 via the network 116.

A local instance of the digital assistant application 108 running on the client device 104 can detect an input audio signal via the sensor 158 and perform initial processing on the input audio signal to generate a request 205. The request 205 can include the input audio signal itself or one or more words identified in the input audio signal using machine learning techniques. The client device 104 can transmit the request 205 to the data processing system 102. A remote instance of the digital assistant application 108 running on the data processing system 102 can perform additional processing on the request 205. The NLP component 118 running on the data processing system 102 can parse the request 205 to determine that the request 205 is referencing a function to be performed by the agent 112. The agent 112 can be maintained by the agent service 106. Using the parsing of the request 205, the direct action handler component 122 running on the data processing system 102 can generate an action data structure to provide as a request 210 to the agent service 106. The request 210 can also include the function to be performed by the agent 112. The data processing system 102 can in turn transmit the request 210 to the agent service 106.

The agent service 106 can perform the function indicated in the request 210. In performing the action, the agent service 106 can generate and transmit a response 215 to the digital assistant application 108. The response 215 can indicate the results of the function performed by the agent service 106 for the agent 112. The digital assistant application 108 running on the data processing system 102 can perform processing to the response 215. For example, the response selector component 124 running on the data processing system 102 can select response data using the response 215. Using the response data, the response selector component 124 running on the data processing system 102 can generate and transmit a response 220 to the client device 104. The audio signal generator component 120 running on the client device 104 can use the response data in the response 220 to generate and present an output audio signal indicating the result of the performance of the function of the agent 112 at the agent service 106. In conjunction, an agent monitor 110 running on the data processing system 102 can generate response metrics 150 using the request 205 or 210 and the response 215 or 220.

Subsequently, the agent monitor 110 can generate and transmit a ping request 225. The ping request 225 can be of same format as the request 205 or 210. The ping request 225 can include an action data structure with a function identifier for one of the functions to be performed by the agent 112 maintained by the agent service 106. Upon receipt of the ping request 225, the agent service 106 can perform the function indicated in the ping request 225. In performing the action, the agent service 106 can generate a ping response 230 to the digital assistant application 108. When the agent service 106 successfully carries out the function indicated in the ping request 225, the ping response 230 can include an indicator specifying that the function was successfully performed. Conversely, when the agent service 106 fails at carrying out the function indicated in the ping request 225, the ping response 230 can include an indicator specifying an error at the agent service 106. The agent service 106 can transmit the ping response 230 to the data processing system 102.

The agent monitor 110 can subsequently receive the ping response 230. The agent monitor 110 can determine an operational status of the agent service 106 for the agent 112 based on the response metrics 150 generated using the request 205 or 210 and the response 215 or 220. The agent monitor 110 can determine the operational status of the agent service 106 further based on the ping request 225 and the ping response 230. For example, the agent monitor 110 can calculate a response time between a transmission time of the request 210 and a receipt time of the response 215 and a response time between the ping request 225 and the ping response 230. The agent monitor 110 can calculate an average response time of the agent service 106 using the two response times. The agent monitor 110 can compare the average response time to a tolerated maximum response time. When the average response time is greater than or equal to the tolerated maximum response time, the agent monitor 110 can determine that the agent service 106 is unresponsive. Conversely, when the average response time is less than the tolerated maximum response time, the agent monitor 110 can determine that the agent service 106 is responsive. Based on the determination of the operational status of the agent service 106, the agent monitor 110 can generate a configuration instruction 235 to provide to the digital assistant application 108. The configuration instruction 235 can specify that the digital assistant application 108 is to continue invoking the agent service 106, when the agent service 106 is determined to be responsive. The configuration instruction 235 can specify that the digital assistant application 108 is to present an output indicating that the agent service 106 is unresponsive, when the agent service 106 is determined to be unresponsive. The agent monitor 110 can provide the configuration instruction 235 to the digital assistant application 108 running on the data processing system 102 and can transmit the configuration instruction 235 to the digital assistant application 108 running on the client device 104.

Referring now to FIG. 3, depicted is the client device 104 with request messages and request messages under two configurations 300 and 350. In both configurations 300 and 350, the agent monitor 110 may have determined that the operational status of the agent service 106 for the agent 112 as unresponsive. The agent monitor 110 may also have configured the digital assistant application 108 running on the client device 104 to perform an action based on the determination that the operational status of the agent service 106 as unresponsive.

Under configuration 300, the digital assistant application 108 running on the client device 104 can detect an input audio signal via the sensor 158. The digital assistant application 108 can apply natural language processing techniques to identify one or more words in the detected input audio signal. The digital assistant application 108 can display the output as a text content item 305 including the words "Play Song 'X'" identified from the input audio signal. The digital assistant application 108 can also determine that the input audio signal is referencing the agent 112 for a subscription-based music service from the words identified in the input audio signal. The agent monitor 110 may already have determined the operational status of the agent service 106 for the subscription-based music service as unresponsive and have configured the digital assistant application 108 based on the operational status. As such, when the digital assistant application 108 determines that the input audio signal is referencing the agent 112 for the subscription-based music service, the digital assistant application 108 can identify the operational status of the agent service 106 as unresponsive. In response, the digital assistant application 108 can present a text content item 310 "I'm sorry. Streaming Service 'A' is currently unresponsive" on the display of the client device 104. The text content item 310 can also be accompanied by an output audio signal indicating that the agent service 106 for the agent 112 is unresponsive.

Under configuration 350, the digital assistant application 108 running on the client device 104 can detect an input audio signal via the sensor 158. The digital assistant application 108 can apply natural language processing techniques to identify one or more words in the detected input audio signal. The digital assistant application 108 can display the output as a text content item 355 including the words "Get me a ride home" identified from the input audio signal. The digital assistant application 108 can also determine that the input audio signal is referencing the agent 112 for a ridesharing application "A" from the words identified in the input audio signal. The agent monitor 110 may already have determined the operational status of the agent service 106 for the ridesharing application "A" as unresponsive. The agent monitor 110 may have determined an alternative agent 112 as substitutable with the original agent 112 determined as referenced by the input audio signal. The agent monitor 110 may have determined that the agent service 106 for the alternative agent 112 such as ridesharing application "B" as also responsive. The agent monitor 110 may have configured the digital assistant application 108 based on these determinations.

Accordingly, when the digital assistant application 108 determines that the input audio signal is referencing the agent 112 for the ridesharing application "A", the digital assistant application 108 can identify the operational status of the agent service 106 as unresponsive. In response, the digital assistant application 108 can present a text content item 360 "I'm sorry. Ridesharing App 'A' is currently unresponsive" on the display of the client device 104. The text content item 360 can also be accompanied by an output audio signal indicating that the agent service 106 for the agent 112 is unresponsive. The digital assistant application 108 can also present the alternative agent 112 as a choice in a text content item 365 "Would you like to use Ridesharing App 'B?'" The text content item 365 can also be accompanied by an output audio signal indicating the alternative agent 112. Subsequently, the digital assistant application 108 can detect an input audio signal via the sensor 158. The digital assistant application 108 can apply natural language processing techniques to identify one or more words in the detected input audio signal. The digital assistant application 108 can display the output as a text content item 370 including the word "Yes" identified from the input audio signal. The digital assistant application 108 can also determine that the word is an acceptance to the semantic content of the text content item 365 using natural language processing techniques. In response, the digital assistant application 108 can present a text content item 375 "Requesting Ridesharing App 'B' for a ride . . . " to indicate that the digital assistant application 108 is interfacing with the alternative agent 112. The text content item 375 can also be accompanied by an output audio signal.

Figure 4:
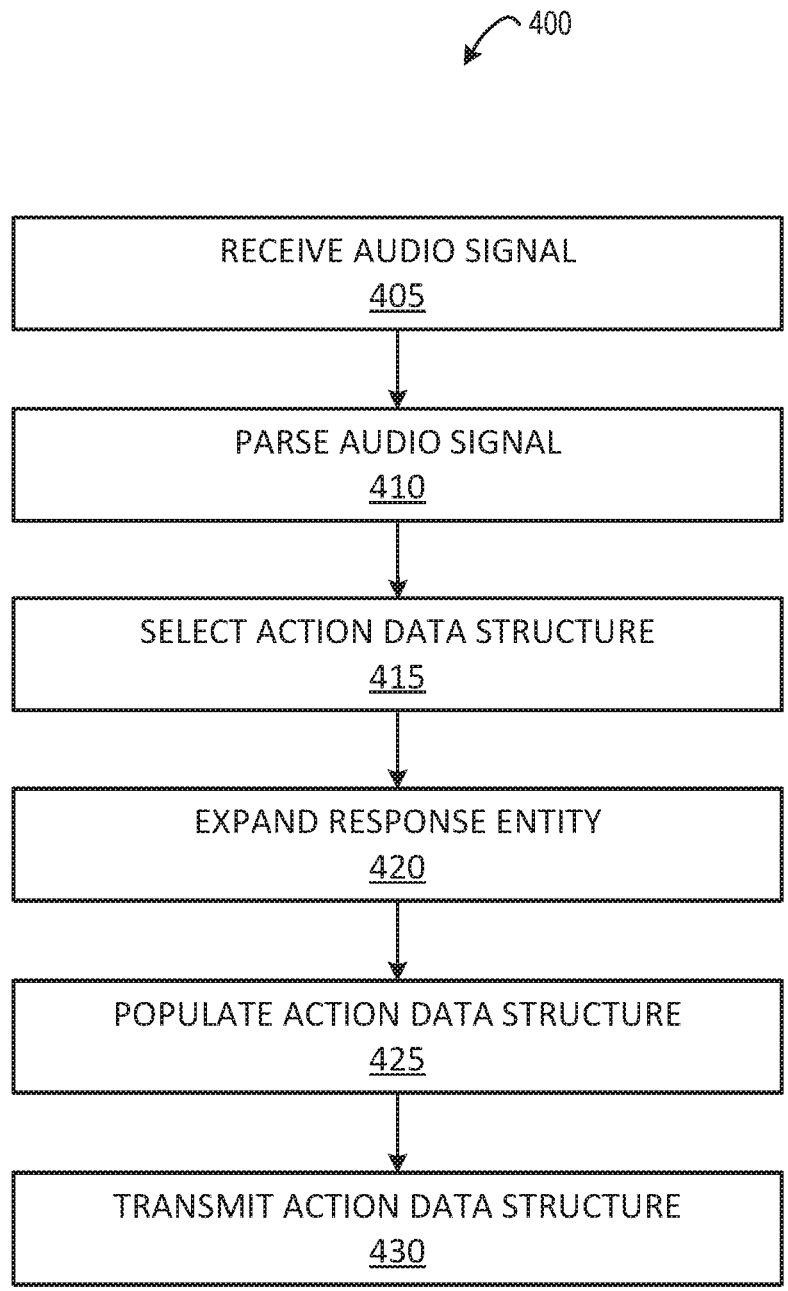
FIG. 4 illustrates a flow diagram of a method to generate voice-activated threads in a networked computer environment, in accordance with an example of the present disclosure.

FIG. 4 illustrates a block diagram of an example method 400 to generate voice-activated threads in a networked computer environment. The method 400 can be implemented or executed by the system 100 described above in conjunction with FIGS. 1-3 or system 600 detailed below in conjunction with FIG. 6. The method can include receiving an input audio signal (405). The method 400 can include parsing the input audio signal (410). The method 400 can include selecting an action data structure (415). The method 400 can include expanding a response entity (420). The method can include populating the action data structure (425). The method 400 can include transmitting the digital component (430).

The method 400 can include can include receiving an input signal (405). The method can include receiving, by an NLP component executed by a data processing system, the input signal. The input signal can be an input audio signal that is detected by a sensor at a first client device and transmitted to the data processing system. The sensor can be a microphone of the first client device. For example, a digital assistant component executed at least partially by a data processing system that includes one or more processors and memory can receive the input audio signal. The input audio signal can include a conversation facilitated by a digital assistant. The conversation can include one or more inputs and outputs. The conversation can be audio based, text based, or a combination of audio and text. The input audio signal can include text input, or other types of input that can provide conversational information. The data processing system can receive the audio input for a session corresponding to the conversation.

The method 400 can include parsing the input signal (410). The NLP component of the data processing system can parse the input signal to identify a request. The NLP component can identify at least one entity in the input signal. The request can be an intent or request that can be fulfilled by one or more service provider devices. The request can be a part of a conversational phrase. For example, the request can be "Ok, order a car to take me home." The entities identified by the NLP component can be phrases or terms in the request that map to input fields or types the service provider device requests when fulfilling a request. For example, the service provider device providing the car service may request a current location input field and a destination input field. Continuing the above example, the NLP component can map the term "home" to the destination input field.

The method 400 can include selecting an action data structure (415). The data processing system can select the action data structure based on the request parsed from the input signal. The data processing system can select the action data structure based on the service provider device that can fulfill the request. The action data structure can be a data structure or object that is created by the service provider device. The service provider device can provide the action data structure to the data processing system. The action data structure can indicate fields, data, or information that the service provider device uses to fulfill requests. The service provider device can flag one or more of the fields to request that the data processing system expand the entity returned for that field. When a field is flagged for expansion, the data processing system can design and generate conversation-based data exchanges with the client device 104 to retrieve information or data for the flagged field rather than the service provider device 160 designing the conversation-based data exchange.

The method 400 can include expanding the response entity (420). The data processing system can determine the entity mapped to the input field needs to be expanded if the entity is not in a format specified by the service provider device. Continuing the above example, the NLP component can determine "home" is the entity mapped to a destination. The direct action handler component can determine to update the action data structure to include the entity "home" in a destination field. The direct action handler component can determine the format of the response entity does not match the format of the destination field. For example, the destination field can have the format of an object that requests a street address, city, state, and zip code. Detecting a mismatch between the format of the response entity and the format of the field, the data processing system can expand the entity to a street address, city, state, and zip code format. For example, the data processing system can look up the address the end user provided the data processing system as the end user's "home" address. The data processing system can expand the entity based on an expansion policy. The expansion policy can indicate whether the data processing system has permission to expand the term or can indicate what end user or client computing device provided data can be included in an expanded entity.

The data processing system can expand the entity based on a request from a service provider device. For example, the data processing system can generate a first action data structure with the unexpanded entity. The data processing system can transmit the first action data structure to the service provider device for processing to fulfill the request. The service provider device can return the action data structure (or a portion thereof) to the data processing system if the service provider device cannot process or understand the data in on or more of the action data structure's fields. For example, the service provider device can attempt to process the "home" entity in the destination field and then request the data processing system expand the "home" entity after the service provider device determines that it cannot process or understand the entity.

The method 400 can include populating the action data structure (425). The direct action handler component can populate the action data structure with the expanded entity. The direct action handler component can populate the action data structure with the entity. For example, the action data structure can be an object into which the entity or expanded entity is stored. Populating the action data structure can also be referred to update the action data structure.

The method 400 can include transmitting the action data structure (430). The data processing system can transmit the populated action data structure to the service provider device. Upon receipt of the action data structure, the service provider device can fulfill the request or request additional information from the data processing system or client computing device.

Figure 5:
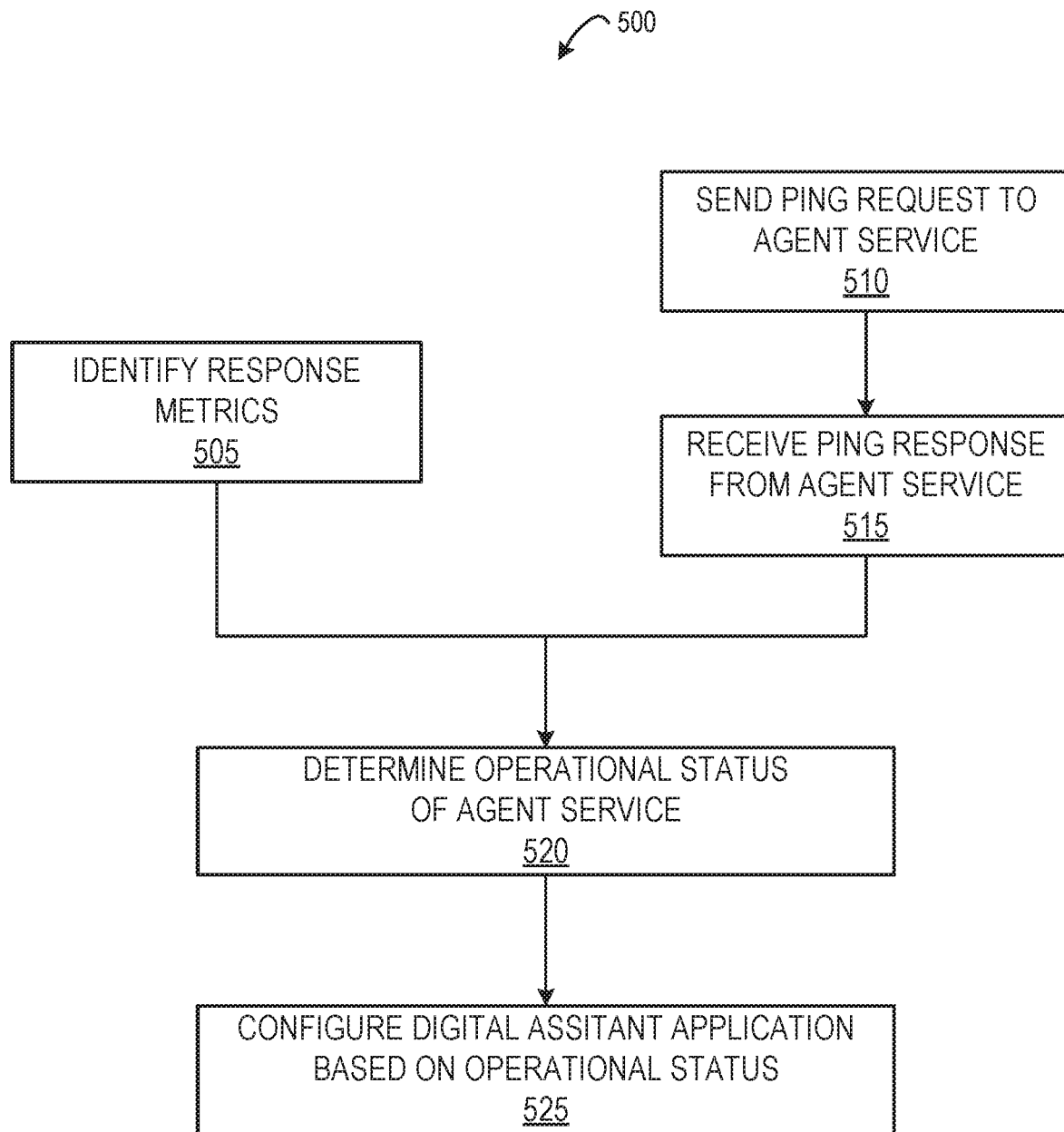
FIG. 5 illustrates a flow diagram of a method to determine operational statuses of agents interfacing with digital assistant applications using the example system illustrated in FIG. 1, in accordance with an example of the present disclosure.

Referring now to FIG. 5, depicted is an example method 500 to determine operational statuses of agents interfacing with digital assistant applications. The method 500 can be implemented or executed by the system 100 described above in conjunction with FIGS. 1-3 or system 600 detailed below in conjunction with FIG. 5. In brief overview, the method 500 can include identifying response metrics (505). The method 500 can include sending a ping request to an agent service (510). The method can include receiving a response from the agent service (515). The method can include determining an operational status of the agent service (520). The method can include configuring a digital assistant application based on the operational status (525).

In further detail, the method 500 can include identifying response metrics (505). A response logger component executing on a data processing system can maintain response metrics on a log database. The response metrics for a request can include a response time, an error rate, and a function type, among others. The response logger component can generate response metrics for each request from a digital assistant application determined as referencing an agent. The response logger component can track communications between the data processing system running the digital assistant application and an agent service for the agent in generating the response metrics. For example, the response logger component can identify a transmission time of the request to the agent service and a receipt time of a response from the agent service. Using the transmission time, the receipt time, and the response itself, the response logger component can generate the response metrics.

The method 500 can include sending a ping request to an agent service (510). Concurrent to the maintenance of response metrics, a probe monitor component executing on the data processing system can generate a ping request. The ping request can include a function identifier and a set of parameters for a function to be performed by the agent service. The probe monitor component can use the response metrics recorded in the log database to generate the ping request. The probe monitor component can generate an action data structure to package the ping request into to send to the agent service.

The method can include receiving a response from the agent service (515). The agent service can receive the ping request from the probe monitor component. In processing the ping request, the agent service can succeed at performing the function indicated in the ping request (e.g., due to improper format or network timeout), and can send the response indicating success to the data processing system. Conversely, the agent service can fail at performing the function indicated in the ping request, and can send the response indicating failure to the data processing system. The probe monitor component can receive the response generated by the agent service in response to the ping request. The probe monitor component can generate response metrics for the response generated in response to the ping request. The response metrics for a request can include a response time, an error rate, and a function type, among others. For example, the probe monitor component can identify a transmission time of the request to the agent service and a receipt time of a response from the agent service. Using the transmission time, the receipt time, and the response itself, the probe monitor component can generate the response metrics.

The method can include determining an operational status of the agent service (520). A status evaluator component executing on the data processing system can use the response metrics maintained on the log database as well as the response from the agent service to the ping request. For example, the status evaluator component can determine an aggregate response metric using the response metrics maintained on the database and the response metric generated for the response from the agent service to the ping request. The aggregate response metric can include an average response time or an error rate of the agent service, among others, or a combination thereof. The status evaluator component can compare the aggregate response metric to a predetermined threshold. The status evaluator component can determine that the aggregate response metric is greater than or equal to the predetermined threshold. In response, the status evaluator component can determine the operational status of the agent service as unresponsive. The status evaluator component can determine that the aggregate response metric is less than the predetermined threshold. In response, the status evaluator component can determine the operational status of the agent service as responsive.

The method can include configuring a digital assistant application based on the operational status (525). An agent manager component executing on the data processing system can identify the operational status of the agent service for the agent as unresponsive. In response to the identification, the agent manager component can configure the digital assistant application to present an output indicating that the agent is unresponsive. The agent manager component can also configure the digital assistant application to present an output indicating an alternative agent to carry out the function. The digital assistant application can present the output in response to determining that the input audio signal is referencing the agent or a function performed by the agent. The agent manager component can identify the operational status of the agent service for the agent responsive. In response to the identification, the agent manager component can configure the digital assistant application to continue invocation of the agent service in response to determining that the input audio signal is referencing the agent or the function performed by the agent.

Figure 6:
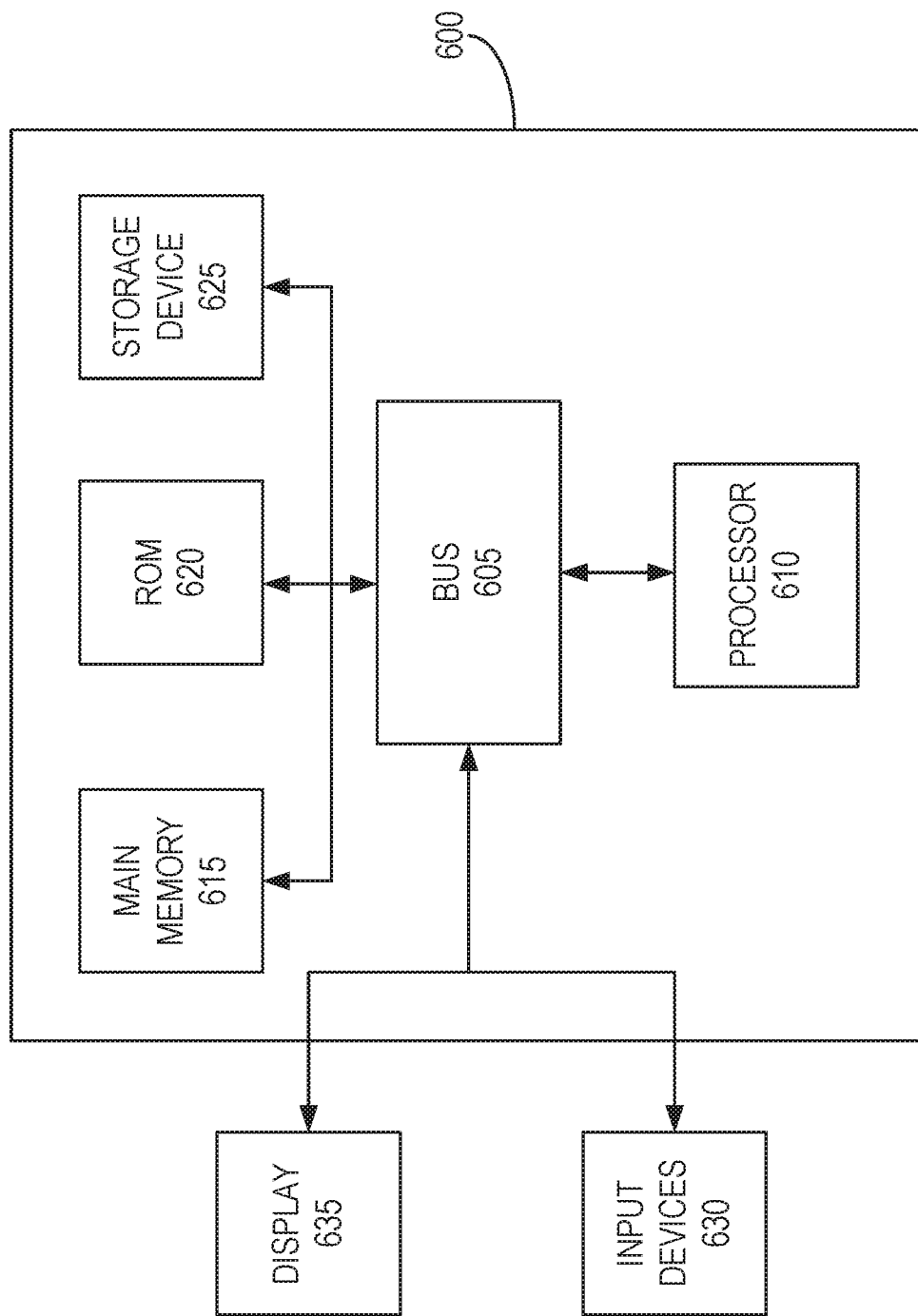
FIG. 6 is a block diagram of an example computer system.

FIG. 6 is a block diagram of an example computer system 600. The computer system or computing device 600 can include or be used to implement the system 100 or its components such as the data processing system 102. The computing system 600 includes a bus 605 or other communication component for communicating information and a processor 610 or processing circuit coupled to the bus 605 for processing information. The computing system 600 can also include one or more processors 610 or processing circuits coupled to the bus for processing information. The computing system 600 also includes main memory 615, such as a random access memory (RAM) or other dynamic storage device, coupled to the bus 605 for storing information and instructions to be executed by the processor 610. The main memory 615 can be or include the data repository 128 or 148. The main memory 615 can also be used for storing position information, temporary variables, or other intermediate information during execution of instructions by the processor 610. The computing system 600 may further include a read-only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions. The storage device 625 can include or be part of the data repositories 128 or 148.

The computing system 600 may be coupled via the bus 605 to a display 635, such as a liquid crystal display or active matrix display, for displaying information to a user. An input device 630, such as a keyboard including alphanumeric and other keys, may be coupled to the bus 605 for communicating information and command selections to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the data processing system 102, the client devices 104, or other components of FIG. 1, for example.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including, by way of example, a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 116). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client devices 104 or the agent service 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 118 and the direction action handler 122 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

[Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A method implemented by one or more processors of a remote data processing system, the method comprising:
   receiving, from a digital assistant application, an input audio signal;
   parsing the input audio signal to identify a request that is fulfillable by an agent service;
   identifying, based on a configuration instruction, from a monitoring service that maintains response metrics for a plurality of agent services, prior to receiving the input audio signal, that an operational status of the agent service is unresponsive, wherein the configuration instruction includes an identification of an alternative agent service;
   causing the digital assistant application to avoid invocation of the agent service, in response to identifying that the operational status of the agent service is unresponsive based on the configuration instruction, wherein causing the digital assistant application to avoid invocation of the agent service comprises causing the digital assistant application to avoid sending, to the agent service, the request based on the input audio signal; and
   identifying an action to cause the digital assistant application to perform, based on the configuration instruction that includes the identification of the alternative agent service.

2. The method according to claim 1, wherein the identifying the action comprises causing the digital assistant application to present the operational status of the agent service as unresponsive.

3. The method according to claim 1, wherein the identifying the action comprises causing the digital assistant application to identify the alternative agent service to fulfill the request.

4. The method according to claim 3, wherein the identifying the action further comprises causing the digital assistant application to present an output that indicates the alternative agent service.

5. The method according to claim 4, wherein an operational status of the alternative agent service is identified as responsive.

6. The method according to claim 4, further comprising:
   receiving, from the digital assistant application, a subsequent input audio signal;
   parsing the subsequent input audio signal to identify a selection of the alternative agent service to fulfill the request; and
   in response to the selection of the alternative agent service, causing the digital assistant application to invoke the alternative agent service to fulfill the request.

7. A computer program product of a remote data processing system comprising one or more non-transitory computer-readable storage media having program instructions collectively stored on the one or more computer-readable storage media, the program instructions executable to:
   receive, from a digital assistant application, an input audio signal;
   parse the input audio signal to identify a request that is fulfillable by an agent service;
   identify, based on a configuration instruction, from a monitoring service that maintains response metrics for a plurality of agent services, prior to receiving the input audio signal, that an operational status of the agent service is unresponsive, wherein the configuration instruction includes an identification of an alternative agent service;

cause the digital assistant application to avoid invocation of the agent service, in response to identifying that the operational status of the agent service is unresponsive based on the configuration instruction, wherein causing the digital assistant application to avoid invocation of the agent service comprises causing the digital assistant application to avoid sending, to the agent service, the request based on the input audio signal; and identify an action to cause the digital assistant application to perform, based on the configuration instruction that includes the identification of the alternative agent service.

8. The computer program product according to claim 7, wherein the identifying the action comprises causing the digital assistant application to present the operational status of the agent service as unresponsive.

9. The computer program product according to claim 7, wherein the identifying the action comprises causing the digital assistant application to identify the alternative agent service to fulfill the request.

10. The computer program product according to claim 9, wherein the identifying the action further comprises causing the digital assistant application to present an output that indicates the alternative agent service.

11. The computer program product according to claim 10, wherein an operational status of the alternative agent service is identified as responsive.

12. The computer program product according to claim 10, the program instructions further being executable to:
receive, from the digital assistant application, a subsequent input audio signal;
parse the subsequent input audio signal to identify a selection of the alternative agent service to fulfill the request; and
in response to the selection of the alternative agent service, cause the digital assistant application to invoke the alternative agent service to fulfill the request.

13. A remote data processing system comprising:
a processor, a computer-readable memory, one or more computer-readable storage media, and program instructions collectively stored on the one or more computer-readable storage media, the program instructions executable to:
receive, from a digital assistant application, an input audio signal;
parse the input audio signal to identify a request that is fulfillable by an agent service;
identify, based on a configuration instruction, from a monitoring service that maintains response metrics for a plurality of agent services, prior to receiving the input audio signal, that an operational status of the agent service is unresponsive, wherein the configuration instruction includes an identification of an alternative agent service;
cause the digital assistant application to avoid invocation of the agent service, in response to identifying that the operational status of the agent service is unresponsive based on the configuration instruction, wherein causing the digital assistant application to avoid invocation of the agent service comprises causing the digital assistant application to avoid sending, to the agent service, the request based on the input audio signal; and
identify an action to cause the digital assistant application to perform, based on the configuration instruction that includes the identification of the alternative agent service.

14. The system according to claim 13, wherein the identifying the action comprises causing the digital assistant application to present the operational status of the agent service as unresponsive.

15. The system according to claim 13, wherein the identifying the action comprises causing the digital assistant application to identify the alternative agent service to fulfill the request.

16. The system according to claim 15, wherein the identifying the action further comprises causing the digital assistant application to present an output that indicates the alternative agent service.

17. The system according to claim 16, wherein an operational status of the alternative agent service is identified as responsive.

18. The system according to claim 16, the program instructions further being executable to:
receive, from the digital assistant application, a subsequent input audio signal;
parse the subsequent input audio signal to identify a selection of the alternative agent service to fulfill the request; and
in response to the selection of the alternative agent service, cause the digital assistant application to invoke the alternative agent service to fulfill the request.

* * * * *